(12) United States Patent
Li et al.

(10) Patent No.: US 8,588,246 B2
(45) Date of Patent: *Nov. 19, 2013

(54) METHOD AND DEVICE FOR DETERMINING SEARCH SPACE, AND METHOD AND DEVICE FOR DETERMINING CANDIDATE CONTROL CHANNEL RESOURCES

(71) Applicant: Huawei Technologies Co., Ltd., Shenzhen (CN)

(72) Inventors: Chaojun Li, Beijing (CN); Lixia Xue, Beijing (CN); Bingyu Qu, Rolling Meadows, IL (US); Lei Guan, Beijing (CN); Zheng Yu, Beijing (CN)

(73) Assignee: Huawei Technologies Co. Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/725,044

(22) Filed: Dec. 21, 2012

(65) Prior Publication Data
US 2013/0107844 A1    May 2, 2013

Related U.S. Application Data

(63) Continuation of application No. 13/406,302, filed on Feb. 27, 2012, which is a continuation of application No. PCT/CN2010/076373, filed on Aug. 26, 2010.

(30) Foreign Application Priority Data

Aug. 28, 2009    (CN) .......................... 2009 1 0166860

(51) Int. Cl.
*H04W 4/00*         (2009.01)
*H04W 48/16*        (2009.01)

(52) U.S. Cl.
CPC ..................... *H04W 48/16* (2013.01)
USPC .......................... 370/438; 455/434

(58) Field of Classification Search
None
See application file for complete search history.

(56) References Cited

U.S. PATENT DOCUMENTS 7,920,516 B2    4/2011 Nishio et al.
2008/0225786 A1*    9/2008 Han et al. ...................... 370/329
(Continued)

FOREIGN PATENT DOCUMENTS

CN    101404526 A    4/2009
EP    1 988 667 A2   11/2008
(Continued)

OTHER PUBLICATIONS

International Search Report, International Application No. PCT/CN2010/076373, Dated: Dec. 9, 2010, 4 pages.

(Continued)

*Primary Examiner* — Timothy J Weidner
(74) *Attorney, Agent, or Firm* — Slater & Matsil, L.L.P.

(57) ABSTRACT

A method for determining a search space includes determining the number of downlink control information bits of each type of control channel currently required to be monitored by a UE. A temporary search space corresponding to the each type of control channel is determined according to a mapping relationship currently used by the UE. It is determined that an actual search space corresponding to a selected type of control channel is all or a part of CCEs of a union of temporary search spaces corresponding to all or a part of control channels with the same number of the downlink control information bits when the DCI bit number of one or more other control channels is the same as the DCI bit number of the selected type of control channel.

21 Claims, 12 Drawing Sheets

(56) References Cited

U.S. PATENT DOCUMENTS

| | | | |
|---|---|---|---|
| 2008/0273479 A1 | 11/2008 | Kwak et al. | |
| 2009/0088148 A1* | 4/2009 | Chung et al. | 455/423 |
| 2009/0168922 A1* | 7/2009 | Malladi et al. | 375/316 |
| 2010/0279628 A1* | 11/2010 | Love et al. | 455/70 |
| 2011/0103321 A1 | 5/2011 | Nisho et al. | |
| 2011/0201333 A1* | 8/2011 | Kwon et al. | 455/434 |

FOREIGN PATENT DOCUMENTS

| | | |
|---|---|---|
| WO | WO 2005/122509 A1 | 12/2005 |
| WO | WO2008/136616 A1 | 11/2008 |
| WO | WO2008/157692 A2 | 12/2008 |
| WO | WO2009/041779 A | 4/2009 |
| WO | WO2009/057283 A1 | 7/2009 |

OTHER PUBLICATIONS

Written Opinion of the International Searching Authority, International Application No. PCT/CN2010/076373, Dated: Dec. 9, 2010, 3 pages.

3GPP TS 36.213 V8.7.0, "3$^{rd}$ Generation Partnership Project; Technical Specification Group Radio Access Network; Evolved Universal Terrestrial Radio Access (E-UTRA); Physcial layer procedures (Release 8)," May 2009, 77 pages.

3GPP TS 36.331 V8.6.0, "3$^{rd}$ Generation Partnership Project; Technical Specification Group Radio Access Network; Evolved Universal Terrestrial Radio Access (E-UTRA) Radio Resource Control (RRC); Protocol specification (Release 8)," Jun. 2009, 207 pages.

First Chinese Office Action of Chinese Application No. 200910166860.1 mailed Oct. 10, 2012, 9 pages. (Partial Translation).

European Search Report received in European Application No. 10811277.2-2412, mailed May 23, 2012, 9 pages.

Huawei, "PDCCH Design for Carrier Aggregation," 3GPP TSG RAN WG1 Meeting #56, R1-090815, Athens, Greece, Feb. 9-13, 2009, 6 pages.

LG Electronics, "Randomization Function for PDCCH Search Space," 3GPP TSG RAN WG1 Meeting #52bis, R1-081567, Shenzhen, China, Mar. 31-Apr. 4, 2008, 16 pages.

Russian Office Action received in Application No. 2012111826/07 mailed Mar. 28, 2013, 14 pages.

* cited by examiner

METHOD AND DEVICE FOR DETERMINING SEARCH SPACE, AND METHOD AND DEVICE FOR DETERMINING CANDIDATE CONTROL CHANNEL RESOURCES

This application is a continuation of U.S. application Ser. No. 13/406,302, filed on Feb. 27, 2012, which is a continuation of International Application No. PCT/CN2010/076373, filed on Aug. 26, 2010, which claims priority to Chinese Patent Application No. 200910166860.1, filed on Aug. 28, 2009, both of which are hereby incorporated by reference in their entireties.

TECHNICAL FIELD

The present invention relates to the field of wireless communication technologies, and in particular, to a method and a device for determining a search space, and a method and a device for determining candidate control channel resources.

BACKGROUND

In a Long Term Evolution (Long Term Evolution, LTE) system, before receiving or sending service data, a user equipment (User Equipment, UE) is required to acquire downlink control information (Downlink Control Information, DCI) configured by an evolved NodeB (Evolved NodeB, eNB) for the user equipment, and the DCI is carried by a physical downlink control channel (Physical Downlink Control channel, PDCCH). One PDCCH is formed by aggregating one, two, four, or eight continuous control channel elements (Control Channel Element, CCE). Each aggregation level (aggregation level) corresponds to one search space (as shown in Table 1), and the aggregation level indicates how many CCEs are aggregated to form one PDCCH. The search space is a to-be-detected PDCCH set of the UE. There are 2 types of search space: common search space (Common search space) and User Equipment specific search space (UE specific search space).

TABLE 1

| Type | Search space | | Number of PDCCHs to be detected |
|---|---|---|---|
| | Aggregation level | Number of CCEs | |
| UE specific search space | 1 | 6 | 6 |
| | 2 | 12 | 6 |
| | 4 | 8 | 2 |
| | 8 | 16 | 2 |
| Common search space | 4 | 16 | 4 |
| | 8 | 16 | 2 |

The related art has the following defects.

In a carrier aggregation (carrier aggregation, CA) system, a user equipment may use multiple component carriers (component carrier, CC) to carry data channel at the same time. One DCI is configured for scheduling data carried on one component carrier or indicating power control and different DCI is carried by different PDCCHs. When the PDCCHs are carried by one component carrier for carrying a control channel or by a small number of component carriers for carrying control channels, since the size of a search space defined in the related art is limited, the blocking probability of PDCCH scheduling is very high.

SUMMARY OF THE INVENTION

The present invention provides a method and a device for determining a search space, and a method and a device for determining candidate control channel resources, so as to reduce the blocking probability of PDCCH scheduling in a carrier aggregation system.

An embodiment method for determining a search space includes determining the number of downlink control information bits of each type of control channel currently required to be monitored by a user equipment, UE determining a temporary search space corresponding to each type of control channel currently required to be monitored by the UE, according to a mapping relationship between a component carrier for carrying a data channel and a component carrier for carrying a control channel, where the mapping relationship is currently used by the UE, and determining that an actual search space corresponding to a selected type of control channel is all CCEs of a union of temporary search spaces corresponding to all or a part of control channels with the same number of the downlink control information bits, or a part of the CCEs of the union of the temporary search spaces corresponding to all or a part of the control channels with the same number of the downlink control information bits, for control channels that are currently required to be monitored by the UE and are of a same control channel element, CCE, aggregation level, when the numbers of the downlink control information bits of one or more other types of control channels are the same as the number of the downlink control information bits of the selected type of control channel where the one or more other types of control channels are one or more types of control channels of the control channels that are currently required to be monitored by the UE and are of a same CCE aggregation level except the selected type of control channel, and the all or a part of control channels with the same number of the downlink control information bits are all or a part of control channels of a control channel set formed by the one or more other types of control channels and the selected type of control channel.

A method for determining candidate control channel resources includes, determining the number of downlink control information bits of each type of control channel currently configurable for a UE, determining temporary candidate control channel resources corresponding to each type of control channel currently configurable for the UE, according to a mapping relationship between a component carrier for carrying a data channel and a component carrier for carrying a control channel, where the mapping relationship is currently configured for the UE, and determining that actual candidate control channel resources corresponding to a selected type of control channel are all CCEs of a union of temporary candidate control channel resources corresponding to all or a part of control channels with the same number of the downlink control information bits, or a part of the CCEs of the union of the temporary candidate control channel resources corresponding to all or a part of the control channels with the same number of the downlink control information bits, for control channels that are currently configurable for the UE and are of a same CCE aggregation level, when the numbers of the downlink control information bits of other types of control channels are the same as the number of the downlink control information bits of the selected type of control channel, where the one or more other types of control channels are one or more types of control channels of the control channels that are currently configurable for the UE and of a same CCE aggregation level except the selected type of control channel, and the all or a part of control channels with the same number of the downlink control information bits are all or a part of control channels of a control channel set formed by the one or more other types of control channels and the selected types of control channel.

A UE includes a control information bit number determination unit, configured to determine the number of downlink control information bits of each type of control channel currently required to be monitored by the UE. A temporary search space determination unit, configured to determine a temporary search space corresponding to each type of control channel currently required to be monitored by the UE, according to a mapping relationship between a component carrier for carrying a data channel and a component carrier for carrying a control channel, where the mapping relationship is currently used by the UE, and an actual search space determination unit, configured to determine an actual search space corresponding to a selected type of control channel to be all CCEs of a union of temporary search spaces corresponding to all or a part of control channels with the same number of the downlink control information bits or a part of the CCEs of the union of the temporary search spaces corresponding to all or a part of the control channels with the same number of the downlink control information bits, for control channels of a same CCE aggregation level, when the numbers of the downlink control information bits of other types of control channels are the same as the number of the downlink control information bits of the selected type of control channel; where the one or more other types of control channels are one or more types of control channels of the control channels that are currently required to be monitored by the UE and are of the same CCE aggregation level except the selected type of control channel; and the all or a part of control channels with the same number of the downlink control information bits are all or a part of control channels of a control channel set formed by the one or more other types of control channels and the selected type of control channel.

A NodeB includes a control information bit number determination unit, configured to determine the number of downlink control information bits of each type of control channel currently configurable for a UE. A temporary candidate control channel resource determination unit, configured to determine temporary candidate control channel resources corresponding to each type of control channel currently configurable for the UE, according to a mapping relationship between a component carrier for carrying a data channel and a component carrier for carrying a control channel, where the mapping relationship is currently configured for the UE, and an actual candidate control channel resource determination unit, configured to determine that actual candidate control channel resources corresponding to a selected type of control channel are all CCEs of a union of temporary candidate control channel resources corresponding to all or a part of control channels with the same number of the downlink control information bits, or a part of the CCEs of the union of the temporary candidate control channel resources corresponding to all or a part of the control channels with the same number of the downlink control information bits, for control channels of a same CCE aggregation level, when the numbers of the downlink control information bits of other types of control channels are the same as the number of the downlink control information bits of the selected type of control channel; where the one or more other types of control channels are one or more types of the control channels that are currently configurable for the UE and of the same CCE aggregation level except the selected type of control channel, and the all or a part of control channels with the same number of the downlink control information bits are all or a part of control channels of a control channel set formed by the one or more other types of control channels and the selected type of control channel.

According to an embodiment of the present invention, a temporary search space corresponding to a control channel currently required to be monitored by a UE is determined according to a mapping relationship between a component carrier for carrying a data channel and a component carrier for carrying a control channel, so temporary search spaces of control channels corresponding to different component carriers for carrying data channels may be different. For control channels currently required to be monitored by the UE and of a same CCE aggregation level, when the numbers of downlink control information bits of one or more other control channels are the same as the number of downlink control information bits of a selected type of control channel, the actual search space corresponding to the selected type of control channel is determined to be all CCEs of a union of temporary search spaces corresponding to all or a part of the control channels with the same number of the downlink control information bits, or to be a part of the CCEs of the union of the temporary search spaces corresponding to all or a part of the control channels with the same number of the downlink control information bits. In addition, the temporary search spaces of the control channels corresponding to different component carriers for carrying data channels may be different, so after combining, the search space corresponding to the control channel is enlarged. Therefore in a carrier aggregation system, the blocking probability of control channel scheduling in the actual search space corresponding to the control channel is decreased, and the number of blind decodings of the control channel on the UE side is not increased.

According to another embodiment of the present invention, temporary candidate control channel resources corresponding to a control channel currently configurable for a UE are determined according to a mapping relationship between a component carrier for carrying a data channel and a component carrier for carrying a control channel, so that temporary candidate control channel resources of the control channels corresponding to different component carriers for carrying data channels may be different. For control channels that are currently configurable for the UE and of a same control channel element, CCE, aggregation level, when the numbers of downlink control information bits of one or more other control channels are the same as the number of downlink control information bits of a selected type of control channel, actual candidate control channel resources corresponding to the selected type of control channel are determined to be all CCEs of a union of temporary candidate control channel resources corresponding to all or a part of the control channels with the same number of the downlink control information bits, or to be a part of the CCEs of the union of the temporary candidate control channel resources corresponding to all or a part of the control channels with the same number of the downlink control information bits. In addition, the temporary candidate control channel resources of the control channels corresponding to different component carriers for carrying data channels may be different, so after combining, the candidate control channel resources corresponding to the control channel are enlarged. Therefore, in a carrier aggregation system, the probability of blocking of control channel scheduling in the actual candidate control channel resources corresponding to the control channel is decreased.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF ILLUSTRATIVE EMBODIMENTS

Figure 1:
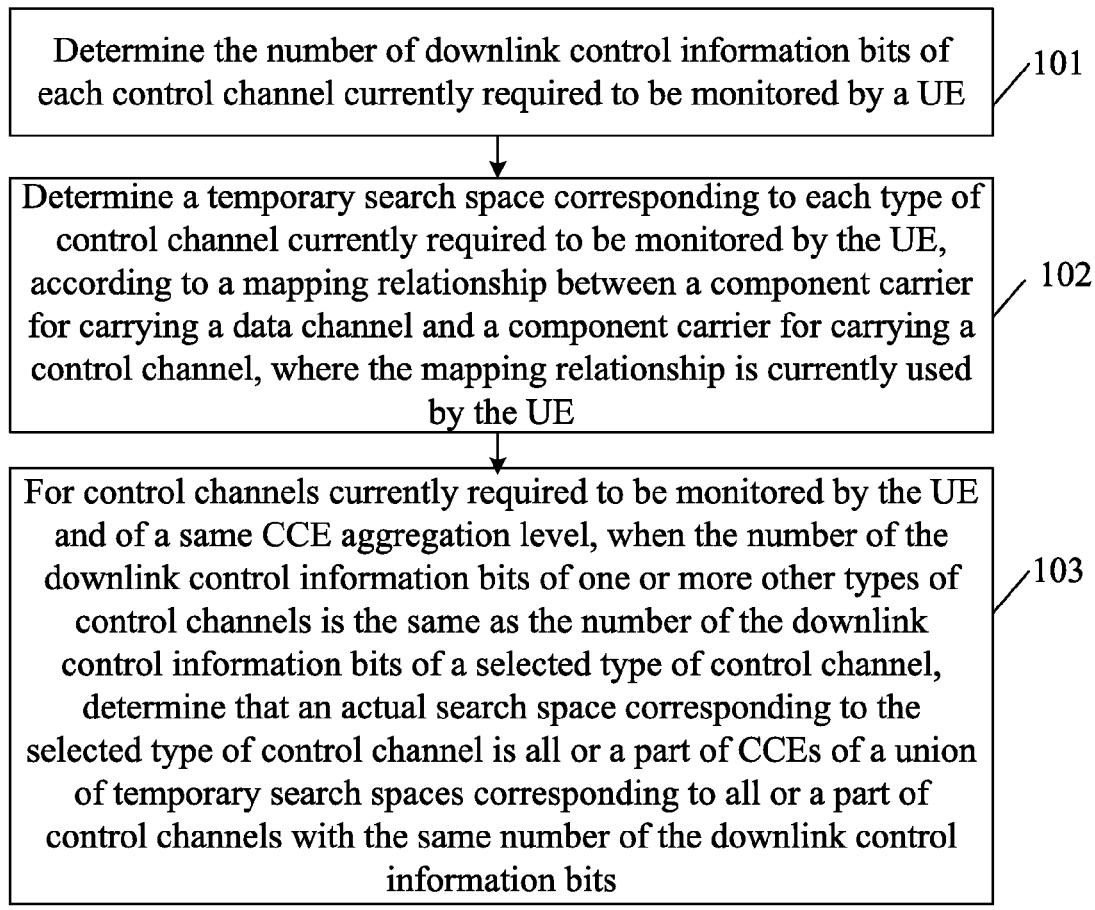
FIG. 1 is a flow chart of a method for determining a search space according to Embodiment 1 of the present invention.

In order to make embodiments of the present invention more comprehensible, applications of a search space of a component carrier for carrying a control channel and a DCI format in a system are first introduced briefly as follows.

The system uses a physical downlink shared channel (Physical Downlink Shared Channel, PDSCH) to transmit downlink data, and the downlink data is sent to a UE from a NodeB. The system uses a physical uplink shared channel (Physical Uplink Shared Channel, PUSCH) to transmit uplink data, and the uplink data is sent by the UE to the NodeB. Before receiving the downlink data or transmitting the uplink data, the UE needs to know scheduling information (scheduling information) configured by the NodeB for the UE, such as time-frequency resource allocation, and modulation and coding scheme. In addition, the NodeB also needs to inform the UE of information of power control commands (power control commands) related to uplink transmission. The scheduling information and the information of the power control commands belong to downlink control information (DCI). A format of the downlink control information is called a DCI format. The DCI format currently configurable for the UE by the NodeB or the DCI format currently required to be monitored by the UE is determined according to a current transmission mode. Downlink control information bits that must be included in each DCI format are predefined, and are called original downlink control information bits in the present invention. Accordingly, the number of the downlink control information bits that must be included in each DCI format is called the number of the original downlink control information bits. The NodeB selects a control channel from candidate control channel resources, and sends the downlink control information to the UE through the selected type of control channel, so that the UE can receive the downlink data or send the uplink data according to the downlink control information. According to the number of the downlink control information bits of each type of control channel currently required to be monitored (that is, the payload size of the downlink control information), the UE blindly decodes all control channels included in the corresponding search spaces, to find downlink control information passing CRC.

In the present invention, the control channel means PDCCH, and the number of the downlink control information bits of the control channel is the number of the information bits of the DCI carried by the control channel. A different carrier bandwidth, a different DCI format, or a different number of transmission antennas may correspond to a different number of the information bits of the DCI. The following features are used to distinguish different types of control channel.

1) Control channels aggregated by different numbers of CCEs are different control channel types: a control channel is aggregated by m continuous CCEs, m is a positive integer, such as 1, 2, 4, or 8, and the present invention does not limit the value of m.

2) Control channels corresponding to different DCI formats are different control channel types: a format of a DCI carried by a control channel may be a DCI format defined by a standard.

3) Different component carriers for carrying data channels correspond to different control channel types.

Control channels currently required to be monitored by a UE or control channels currently configurable by a NodeB may include control channels formed by aggregating different numbers of CCEs, or may include control channels corresponding to different DCI formats, or may include control channels corresponding to different component carriers for carrying data channels. For example, the number of component carriers that are for carrying data channels and are currently required to be monitored by the UE (that is, can be configured by a NodeB) is 2 (a CC1 and a CC2). The transmission mode of the CC1 is downlink single-antenna transmission, and corresponding DCI formats are a DCI format 1 and a DCI format 1A. The transmission mode of the CC2 is closed-loop space division multiplexing, and corresponding DCI formats are a DCI format 2 and the DCI format 1A. Assuming that currently supported CCE aggregation levels are 4 and 8, eight types of control channels are currently required to be monitored by the UE (that is, can be configured by the NodeB for the UE): (1) a control channel corresponding to the CC1, with the CCE aggregation level being 4, and corresponding to the DCI format 1; (2) a control channel corresponding to the CC1, with the CCE aggregation level being 8, and corresponding to the DCI format 1; (3) a control channel corresponding to the CC1, with the CCE aggregation level being 4, and corresponding to the DCI format 1A; (4) a control channel corresponding to the CC1, with the CCE aggregation level being 8, and corresponding to the DCI format 1A; (5) a control channel corresponding to the CC2, with the CCE aggregation level being 4, and corresponding to the DCI format 2; (6) a control channel corresponding to the CC2, with the CCE aggregation level being 8, and corresponding to the DCI format 2; (7) a control channel corresponding to the CC2, with the CCE aggregation level being 4, and corresponding to the DCI format 1A; and 8) a control channel corresponding to the CC2, with the CCE aggregation level being 8, and corresponding to the DCI format 1A.

The candidate control channel resources in the present invention are a set of candidate control channels that can be configured by the NodeB for the UE, are a set of logic resources defined according to CCEs, and include: a beginning CCE number of the candidate control channel resources, the number of the CCEs, and other parameters representing the candidate control channel resources, which are not limited by the present invention. It should be noted that, each type of control channel corresponds to one candidate control channel set. The search space is a set of logic resources defined according to the CCEs, is a set of control channels required to be monitored, and includes: a beginning CCE number of the search space, the number of the CCEs, and other parameters representing the search space, which are not limited by the present invention. It should be noted that, each type of control channel corresponds to one search space. For a same control channel, the candidate control channel resources cannot be larger than the search space, that is, the candidate control channel set that can be configured by the NodeB is equal to the a control channel set required to be monitored by the UE, or the candidate control channel set that can be configured by the NodeB is a subset of the a control channel set required to be monitored by the UE. The search spaces may be categorized into a common search space (Common search space) and a user equipment specific search space (UE specific search space). The search space of the present invention refers to the UE specific search space. The determination of the common search space may be performed by using the method according to the present invention or not, which is not limited by the present invention.

Embodiment 1

Referring to FIG. 1, according to Embodiment 1 of the present invention, a method for determining a search space is provided, including:

101: Determine the number of downlink control information bits of each type of control channel currently required to be monitored by a UE.

The number of the downlink control information bits of each type of control channel currently required to be monitored by the UE may be determined according to a configuration rule of the number of the downlink control information bits and a format of the DCI carried by each type of control channel currently required to be monitored by the UE. The configuration rule of the number of the downlink control information bits is the rule that specifies that the numbers of the downlink control information bits of multiple DCI formats are the same. The numbers of the original downlink control information bits of the multiple DCI formats may not be the same. The rule specifies in which cases the numbers of the downlink control information bits of the DCI formats should be configured to be the same. Specifically, the numbers of the downlink control information bits of the DCI formats may be configured to be the same by adding redundant information bits or additional useful information bits.

The configuration rule of the number of the downlink control information bits includes at least one of the following rules.

The numbers of the downlink control information bits of the DCI formats corresponding to a same frequency domain resource allocation manner are the same.

The numbers of the downlink control information bits of the DCI formats with frequency domain resource allocation manners being the same and the maximum number of indicatable transport blocks being the same are the same.

Under different resource conditions configured currently, if a difference between the numbers of the downlink control information bits corresponding to a same DCI format is smaller than a preset value, the numbers of the downlink control information bits of the DCI format are configured to be a unique value.

102: Determine a temporary search space corresponding to each type of control channel currently required to be monitored by the UE, according to a mapping relationship between a component carrier for carrying a data channel and a component carrier for carrying a control channel, where the mapping relationship is currently used by the UE.

The component carriers for carrying control channels are component carriers of a first carrier set, and the first carrier set is a set of component carriers used to transmit control channels. The component carriers for carrying data channels are component carries of a second carrier set, and the second carrier set is a downlink component carrier set and/or an uplink component carrier set. The user equipment may receive a PDSCH on any one or more downlink component carriers of the downlink component carrier set. The user equipment may send a PUSCH on any one or more uplink component carriers of the uplink component carrier set.

The mapping relationship between the component carrier for carrying a data channel and the component carrier for carrying a control channel, where the mapping relationship is currently used by the UE, may be a one-to-one relationship or a many-to-one relationship.

Specifically, when the mapping relationship between the component carrier for carrying a data channel and the component carrier for carrying a control channel, where the mapping relationship is currently used by the UE, is one-to-one, for time division duplex (Time Division Duplex, TDD), the component carrier for carrying a data channel and a mapped component carrier thereof for carrying a control channel are the same component carrier; and for frequency division duplex (Frequency Division Duplex, FDD), when the component carrier for carrying a data channel is the component carrier for carrying an uplink data channel, the component carrier for carrying an uplink data channel and a mapped component carrier thereof for carrying a control channel are the component carriers of a same component carrier pair, and when the component carrier for carrying a data channel is the component carrier for carrying a downlink data channel, the component carrier for carrying a downlink data channel and a mapped component carrier thereof for carrying a control channel are the same component carrier. A downlink component carrier and its paired uplink component carrier are called a component carrier pair. Specifically, pairing may be performed according to defined duplex spacing (that is, carrier frequency spacing between an uplink component carrier and a downlink component carrier), and the present invention does not limit the method for pairing.

Specifically, when the mapping relationship between the component carrier for carrying a data channel and the component carrier for carrying a control channel, where the mapping relationship is currently used by the UE, is the many-to-one relationship, for the time division duplex (Time Division Duplex, TDD), the component carrier for carrying a data channel and a mapped component carrier thereof for carrying a control channel may be the same component carrier or may not be the same component carrier; and for the frequency division duplex (Frequency Division Duplex, FDD), when the component carrier for carrying a data channel is the component carrier for carrying an uplink data channel, the component carrier for carrying an uplink data channel and its mapped component carrier for carrying a control channel may be the component carriers of a same component carrier pair or may not be the component carriers of the same component carrier pair; and when the component carrier for carrying a data channel is the component carrier for carrying a downlink data channel, the component carrier for carrying a downlink data channel and a mapped component carrier thereof for carrying a control channel may be the same component carrier or may not be the same component carrier.

In this step, the mapping relationship between the component carrier for carrying a data channel and the component carrier for carrying a control channel, where the mapping relationship is currently used by the UE, may be predefined by a standard, and may also be indicated by first mapping relationship indication information that is received by the UE and sent by a NodeB before the step. The first mapping relationship indication information is used to indicate a mapping relationship selected by the NodeB from multiple mapping relationships between the component carriers for carrying data channels and the component carriers for carrying control channels, where the mapping relationships are currently configurable for the UE. The UE determines the mapping relationship between the component carrier for carrying a data channel and the component carrier for carrying a control channel, where the mapping relationship is currently being used by the UE, according to the first mapping relationship indication information and the multiple mapping relationships between the component carriers for carrying data channels and the component carriers for carrying control channels, where the mapping relationships are currently configurable for the UE. The mapping relationship predefined by a standard is a mapping relationship defined by a communication standard or protocol.

Alternatively, before the step, the UE receives second mapping relationship indication information sent by the NodeB. The second mapping relationship indication information is used to indicate a mapping relationship between the component carrier for carrying a data channel and the component carrier for carrying a control channel, where the mapping relationship is currently used by the UE under the mapping rule predefined by a standard. The mapping rule predefined by a standard is a mapping rule defined by a communication standard or protocol, and the mapping rule includes at least one of the following rules: when a component carrier for carrying a data channel can carry a control channel, the component carrier for carrying a data channel and a mapped component carrier thereof for carrying a control channel are the same component carrier; when a downlink component carrier paired with an uplink component carrier for carrying a data channel can carry a control channel, the uplink component carrier for carrying a data channel and its mapped component carrier for carrying a control channel are component carriers of a same component carrier pair; or component carriers of different component carrier bandwidth levels for carrying data channels cannot be mapped to a same component carrier for carrying a control channel; or component carriers of different transmission modes for carrying data channels cannot be mapped to a same component carrier for carrying a control channel; or component carriers of different frequency bands for carrying data channels cannot be mapped to a same component carrier for carrying a control channel.

103: For control channels that are currently required to be monitored by the UE and are of a same control channel element, CCE, aggregation level, when the numbers of the downlink control information bits of one or more other types of control channels are the same as the number of the downlink control information bits of a selected type of control channel, determine that an actual search space corresponding to the selected type of control channel is all CCEs of a union of temporary search spaces corresponding to all or a part of control channels with the same number of the downlink control information bits, or to be a part of the CCEs of the union of the temporary search spaces corresponding to all or a part of the control channels with the same number of the downlink control information bits.

The one or more other types of control channels are one or more types of control channels of the control channels that are currently required to be monitored by the UE and are of the same CCE aggregation level except the selected type of control channel. The all or a part of control channels with the same number of the downlink control information bits are all or a part of control channels of a control channel set formed by the one or more other types of control channels and the selected type of control channel.

According to Embodiment 1 of the present invention, the temporary search space corresponding to the control channels currently required to be monitored by the UE is determined according to the mapping relationship between the component carrier for carrying a data channel and the component carrier for carrying a control channel, so the temporary search spaces of the control channels corresponding to different component carriers for carrying data channels may be different. For the control channels that are currently required to be monitored by the UE and are of the same CCE aggregation level, when the numbers of the downlink control information bits of one or more other types of control channels are the same as the number of the downlink control information bits of the selected type of control channel, the actual search space corresponding to the selected type of control channel is determined to be all of the CCEs of the union of the temporary search spaces corresponding to all or a part of the control channels with the same number of the downlink control information bits or a part of the CCEs of the union of the temporary search spaces corresponding to all or a part of the control channels with the same number of the downlink control information bits. In addition, the temporary search spaces of the control channels corresponding to different component carriers for carrying data channels may be different, so after combining, the search space corresponding to the control channel is enlarged. Therefore, in a carrier aggregation system, the blocking probability of control channel scheduling in the actual search space corresponding to the control channel is decreased, and the number of blind decodings of the control channel on the UE side is not increased.

Embodiment 2

Figure 2:
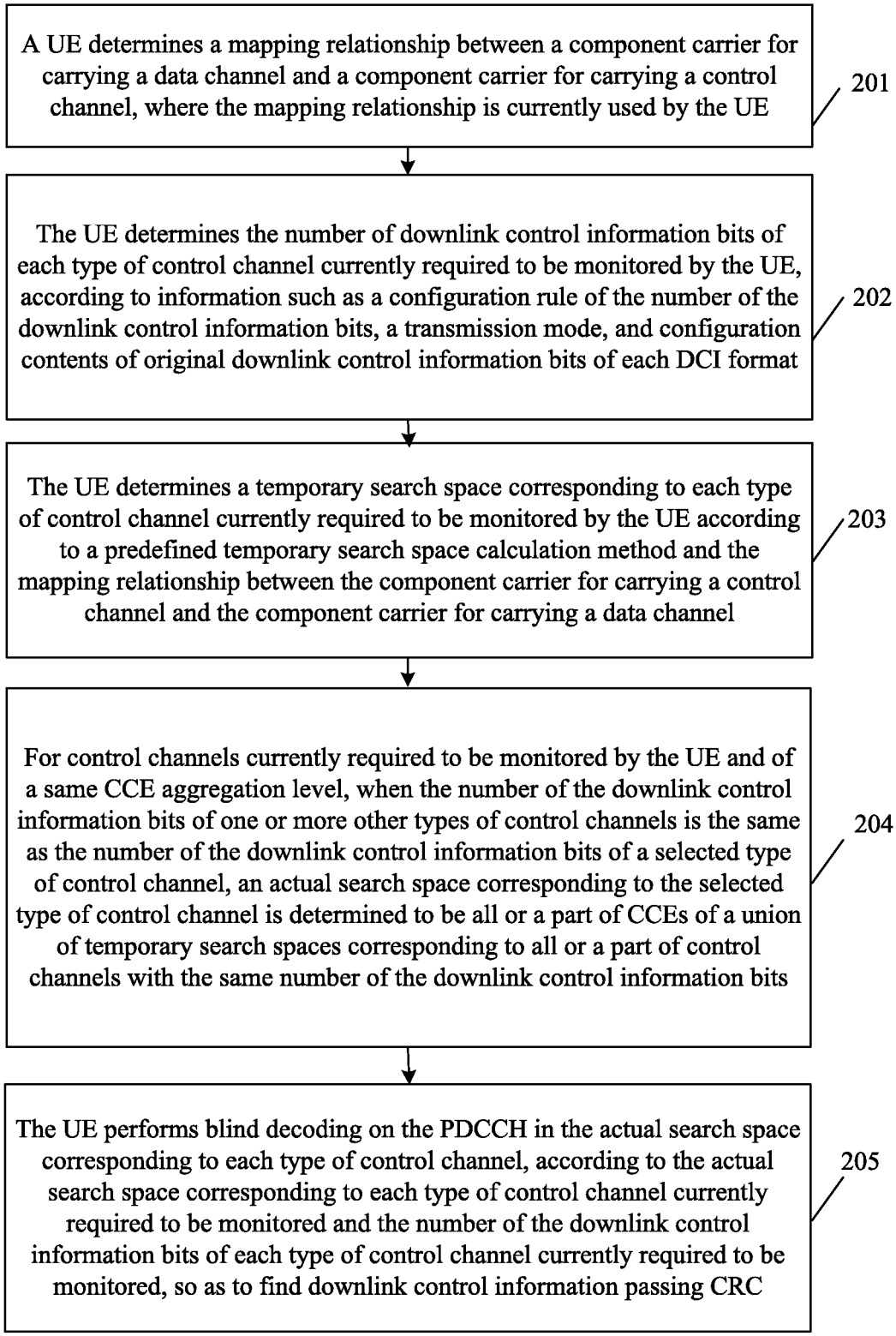
FIG. 2 is a flow chart of a method for monitoring a control channel according to Embodiment 2 of the present invention.

Referring to FIG. 2, according to Embodiment 2 of the present invention, a method for monitoring a control channel is provided. In the embodiment, determination of a search space is mainly described in terms of a UE side, and the method specifically includes:

201: A UE determines a mapping relationship between a component carrier for carrying a data channel and a component carrier for carrying a control channel, where the mapping relationship is currently used by the UE.

Specifically, the determining, by the UE, the mapping relationship between the component carrier for carrying a data channel and the component carrier for carrying a control channel, where the mapping relationship is currently used by the UE, may be implemented in the following manners.

A first manner is as follows. The mapping relationship between the component carrier for carrying a data channel and the component carrier for carrying a control channel may be predefined, where the predefined mapping relationship is defined by a communication standard or protocol. In this step, the UE determines which component carrier in a first carrier set each component carrier of a second carrier set is mapped to (that is, corresponds to), according to the mapping relationship predefined by a standard.

Figure 3:
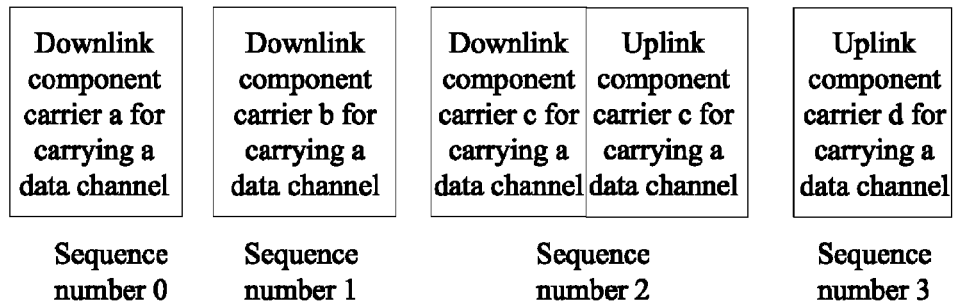
FIG. 3 is a schematic diagram of a corresponding relationship between a component carrier for carrying a data channel and a sequence number according to an embodiment of the present invention.

The standard-predefined mapping relationship between the component carrier for carrying a data channel and the component carrier for carrying a control channel may be a function relationship. For example, the function relationship includes, but is not limited to, the following formula: $I_{PDCCH-CC}(k)=(floor(c \times k+\delta))mod\ N_{PDCCH-CC}$, where k is a sequence number of the component carrier for carrying a data channel in the second carrier set, k is an integer, $I_{PDCCH-CC}(k)$ is a sequence number of the component carrier for carrying a control channel in the first carrier set, and $I_{PDCCH-CC}(k)$ is an integer. Sequence numbers of component carriers in the first carrier set and/or the second carrier set may be arranged according to indicators of the component carriers, or carrier frequencies of the component carrier, or other rules. In addition, when the second carrier set is a union of a downlink component carrier set and an uplink component carrier set, a sequence number of an uplink component carrier and a sequence number of a downlink component carrier of a same component carrier pair may be the same. For example, as shown in FIG. 3, arrangement is first performed according the indicators or the carrier frequencies of the downlink component carriers. A position of an uplink component carrier paired with a downlink component carrier in an array is arranged to be the same as that of the downlink component carrier. An uplink component carrier that is not paired with any downlink component carrier is placed in the array according to an indicator or a carrier frequency of the uplink component carrier. Then, the component carriers are provided with sequence numbers according to the order of the array, and the present invention does not limit the arrangement of the sequence numbers. Moreover, mod represents modulo operation. $N_{PDCCH-CC}$ represents the number of component carriers in the first carrier set. $\delta$ is an integer representing an offset, that is, as to the sequence number of a component carrier for carrying a control channel, where a component carrier for carrying a data channel with its sequence number being 0 is mapped to the component carrier for carrying a control channel, different offsets may be set according to different requirements of scenarios. For example, when the component carrier for carrying a data channel with its sequence number being 0 and the component carrier for carrying a control channel with its sequence number being 1 are the same component carrier, in order to achieve a one-to-one relationship between the component carrier for carrying a data channel and the component carrier for carrying a control channel, it may be set that $\delta=1$. c is an integer or a fraction, for example, when c=1, it represents that component carriers of a second component carrier set are in turn mapped to component carriers of a first component carrier set, and when c=½ and $N_{PDCCH-CC}=2$, it represents that a group formed by each two component carriers or each component carrier pair of the second component carrier set is in turn mapped to the component carrier of the first component carrier set. Floor represents rounding towards minus infinity, for example, floor(0.5)=0. When both $\delta$ and c are integers, floor( ) may be omitted, that is, $I_{PDCCH-CC}(k)=(c \times k+\delta)mod\ N_{PDCCH-CC}$. $\delta$ and c may be fixed values predefined by a standard, or a UE-specific value defined by a standard, that is, different values are used for different UEs. For example, $$c = \sum_{i=0}^{N} C(n_s, n_{RNTI}) \cdot 2^i,$$

where C(k) represents a pseudo-random sequence with its initial value related to $n_{RNTI}$; $n_{RNTI}$ is the value of an RNTI, that is, an indicator of the UE; $n_s$ is a current time slot number, N is an integer, and in this way, in different moments, the component carrier for carrying a data channel may be randomly mapped to the component carrier for carrying a control channel, and it is similar for $\delta$.

Figure 4:
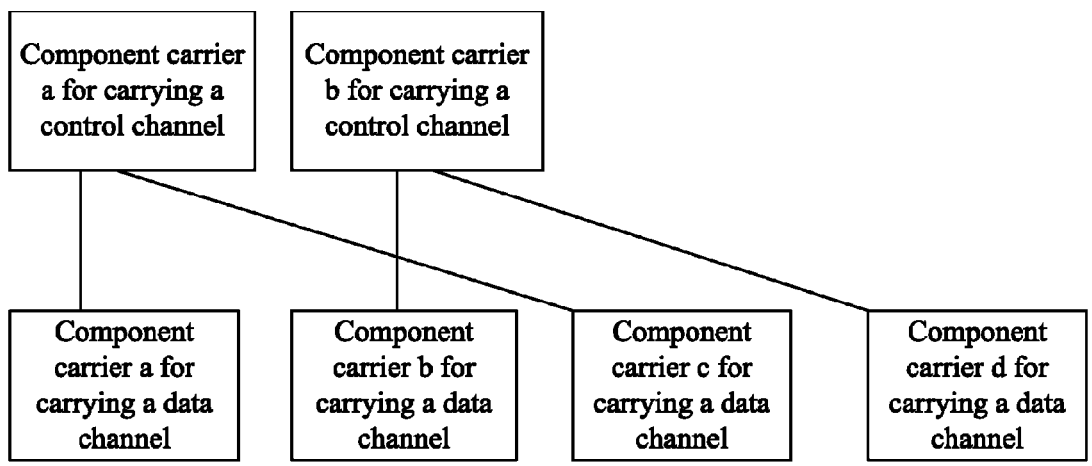
FIG. 4 is a schematic diagram of a mapping relationship between a component carrier for carrying a data channel and a component carrier for carrying a control channel, where the mapping relationship is obtained according to a function relationship, according to an embodiment of the present invention.

As shown in FIG. 4, the sequence number of component carrier a for carrying a data channel is set to 0, the sequence number of component carrier b for carrying a data channel is set to 1, the sequence number of component carrier c for carrying a data channel is set to 2, the sequence number of component carrier d for carrying a data channel is set to 3, the sequence number of component carrier a for carrying a control channel is set to 0, and the sequence number of component carrier b for carrying a control channel is set to 1, so $N_{PDCCH-CC}=2$; in addition, it is set that $\delta=0$ and c=1, so when k=0, it is calculated that $I_{PDCCH-CC}(k)=0$, which represents that component carrier a for carrying a data channel is mapped to component carrier a for carrying a control channel; when the sequence number k=1, it is calculated that $I_{PDCCH-CC}(k)=1$, which represents that component carrier b for carrying a data channel is mapped to component carrier b for carrying a control channel; when the sequence number k=2, it is calculated that $I_{PDCCH-CC}(k)=1$, and component carrier c for carrying a data channel is mapped to component carrier a for carrying a control channel; and when the sequence number k=3, it is calculated that $I_{PDCCH-CC}(k)=1$, and component carrier d for carrying a data channel is mapped to component carrier b for carrying a control channel.

A second manner is as follows. A UE receives a semi-static or dynamic notification message sent by a NodeB. The notification message carries first mapping relationship indication information. The first mapping relationship indication information is used to indicate a mapping relationship selected by the NodeB from multiple mapping relationships between the component carriers for carrying data channels and the component carriers for carrying control channels, where the mapping relationships are currently configurable for the UE. The UE determines the mapping relationship between the component carrier for carrying a data channel and the component carrier for carrying a control channel, where the mapping relationship is currently used by the UE, according to the first mapping relationship indication information and the multiple mapping relationships between the component carrier for carrying a data channel and the component carrier for carrying a control channel, where the mapping relationships are currently configurable for the UE. Assuming that N mapping relationships are available, it represents that the number of bits indicating which mapping relationship is to be used is at least $\log_2 N$. For example, in FIG. 4, each component carrier for carrying a data channel has two options, that is, the component carrier for carrying the data channel may be mapped to a component carrier a for carrying a control channel or a component carrier b for carrying a control channel. Totally, four component carriers for carrying data channels exist, so the number of available mapping relationships is $2^4=16$, and at least 4 bits are required to represent the mapping relationship currently used.

In addition, according to the mapping relationship provided according to the first manner, different parameters correspond to different mapping relationships, UE receives the semi-static or dynamic notification message sent by the NodeB, and acquires parameters currently configured by the NodeB. For example, a range of values of $\delta$ is $\{0, 1, 2, 3\}$, and at least two bits are required to notify a specific value of $\delta$.

The dynamic notification message is dynamic signaling with a high sending frequency, and the dynamic signaling may be sent according to a sub-frame level time interval. The semi-static notification message is semi-static signaling with a relatively low sending frequency, and the semi-static signaling may be sent periodically.

A third manner is as follows. A standard predefines one or more mapping rules between component carriers for carrying data channels and component carriers for carrying control channels. The mapping rule predefined by a standard is a mapping rule defined by a communication standard or protocol.

The mapping rule may include, but is not limited to, the following rules. (1) When a component carrier for carrying a data channel can carry a control channel, the component carrier for carrying a data channel and a mapped component carrier thereof for carrying a control channel are the same component carrier; and when a downlink component carrier paired with an uplink component carrier for carrying a data channel can carry a control channel, the uplink component carrier for carrying a data channel and its mapped component carrier for carrying a control channel are the component carriers of a same component carrier pair. (2) Component carriers of different component carrier bandwidth levels for carrying data channels cannot be mapped to a same component carrier for carrying a control channel, where in dividing the component carrier bandwidth levels, each kind of component carrier bandwidth may be used as a level, or each category of component carrier bandwidth is used as a level. For example, component carriers with a bandwidth difference smaller than 5 MHz are of a same component carrier bandwidth level, so 1.4 MHz, 3 MHz, and 5 MHz are of a same component carrier bandwidth level. (3) Component carriers of different transmission modes for carrying data channels cannot be mapped to a same component carrier for carrying a control channel. (4) For discontinuous carrier aggregation, component carriers of different frequency bands for carrying data channels cannot be mapped to a same component carrier for carrying a control channel.

The UE receives second mapping relationship indication information sent by the NodeB, and the second mapping relationship indication information is used to indicate a mapping relationship between a component carrier for carrying a data channel and a component carrier for carrying a control channel, where the mapping relationship is capable of being used by the UE under the mapping rule predefined by a standard. The mapping relationship between the component carrier for carrying a data channel and the component carrier for carrying a control channel, where the mapping relationship is capable of being used by the UE, is a mapping relationship selected by the NodeB from multiple existing mapping relationships under the mapping rule predefined by a standard.

For example, as shown in FIG. 4, two component carriers for carrying data channels correspond to a component carrier for carrying a control channel, and according to the mapping rule (1), the two component carriers for carrying data channels and the corresponding component carrier thereof for carrying a control channel are mapped to each other, so only mapping relationships of two component carriers for carrying data channels are currently informed UE. That is, the number of configurable mapping relationships that are currently notified is only $2^2=4$ (however in the second manner, 16 mapping relationships exist in FIG. 4). In this step, UE receives the second mapping relationship indication information, and the indication information represents a mapping relationship selected by the NodeB.

For example, as shown in FIG. 4, the bandwidth of the component carrier a for carrying a data channel and that of the component carrier b for carrying a data channel are both 20 MHz, and the bandwidth of the component carrier c and that of the component carrier d are both 10 MHz. According to the mapping rule (2), the component carriers a and/or b for carrying data channels and the component carriers c and/or d cannot be mapped to a same component carrier for carrying a control channel. Therefore, only two mapping relationships are currently configurable, that is: the component carriers a and b for carrying data channels are mapped to the component carrier a for carrying a control channel, and the component carriers c and d for carrying data channels are mapped to the component carrier b for carrying a control channel; or, the component carriers a and b for carrying data channels are mapped to the component carrier b for carrying a control channel, and the component carriers c and d for carrying data channels are mapped to the component carrier a for carrying a control channel. In this step, the UE receives the second mapping relationship indication information sent by the NodeB, and the indication information represents a mapping relationship selected by the NodeB.

It can be seen that, the method in which the predefined mapping rule formed with signaling notification may save signaling overheads, and for the mapping rules (3) and (4), the method in which the signaling notification is formed with may also be used, which is not repeated here.

202: the UE determines the number of downlink control information bits of each type of control channel currently required to be monitored by the UE, according to the configuration rule of the number of the downlink control information bits, the transmission mode, the component carrier bandwidth, the number of transmission antennas, and configuration contents of original downlink control information bits of each DCI format, etc.

In the first step, DCI format(s) corresponding to each component carrier that is for carrying a data channel and is currently used by the UE are determined according to a transmission mode of each component carrier that is for carrying a data channel and is currently capable of being used, so as to determine a format of DCI carried over a control channel corresponding to each component carrier that is for carrying a data channel and is currently used by the UE, that is, the format of the DCI carried over each type of control channel currently required to be monitored by the UE.

In the second step, the number of the original downlink control information bits of the DCI format corresponding to each component carrier for carrying a data channel is determined according to the component carrier bandwidth of each component carrier for carrying a data channel, the number of transmission antennas, and the configuration contents of original downlink control information bits of each kind of DCI format, so as to determine the number of the original downlink control information bits of the DCI format corresponding to each type of control channel currently required to be monitored by the UE.

In the third step, the number of the downlink control information bits of each type of control channel currently required to be monitored by the UE is determined according to the configuration rule of the number of the downlink control information bits and the number of the original downlink control information bits of the DCI format corresponding to each type of control channel currently required to be monitored by the UE.

The configuration rule of the number of the downlink control information bits is a rule specifying that the numbers of the downlink control information bits of multiple DCI formats are the same. The rule may be predefined by a standard, that is, the standard-predefined configuration rule of the number of the downlink control information bits is a rule defined by a communication standard or protocol. Alternatively, before the step, the UE receives a message that is sent by the NodeB and carries the configuration rule of the number of the downlink control information bits.

The configuration rule of the number of the downlink control information bits may include at least one of the following rules.

(1) The number of the downlink control information bits of a DCI format corresponding to an uplink component carrier for carrying a data channel and the number of the downlink control information bits of a DCI format corresponding to a downlink component carrier for carrying a data channel are the same, where the uplink component carrier and the downlink component carrier have a same transmission mode.

The same number of the bits may be the maximum value among the numbers of the original control information bits of the DCI formats corresponding to the uplink component carrier for carrying a data channel and the downlink component carrier for carrying a data channel, where the uplink component carrier and the downlink component carrier have a same transmission mode.

It should be noted that, each transmission mode may correspond to one or two DCI formats. If each transmission mode corresponds to two DCI formats, one of the DCI formats is supported by all transmission modes of the downlink component carrier or the uplink component carrier. For example, a downlink single-antenna transmission mode supports a DCI format 1 and a DCI format 1A, the DCI format 1A is supported by all of the downlink transmission modes, and the two DCI formats corresponding to the transmission mode do not include the DCI formats supported by all the downlink uplink transmission modes or by all the uplink transmission modes.

For example, closed-loop space division multiplexing transmission of a downlink component carrier corresponds to a DCI format 2 and a DCI format 1A, and closed-loop space division multiplexing transmission of an uplink component carrier corresponds to a DCI format 02 and a DCI format 0. Since both the downlink component carrier and the uplink component carrier adopt the same transmission mode, the number of the downlink control information bits of the DCI format 2 and the number of the downlink control information bits of the DCI format 02 are the same.

Before the step, the UE receives a message that is sent by the NodeB to notify a transmission mode of the UE. In the step, the UE may determine, according to the transmission mode of the UE, each DCI format currently required to be monitored by the UE. When the transmission mode of the uplink component carrier and the transmission mode of the downlink component carrier are the same, the numbers of the downlink control information bits of the DCI formats corresponding to the two transmission modes are the same.

(2) Under conditions that the component carrier bandwidths are the same or the component carrier bandwidth levels are the same, if a difference between the numbers of the original downlink control information bits of multiple DCI formats is smaller than a preset value, the numbers of the downlink control information bits of the multiple DCI formats are the same. The same number of the bits may be the maximum value among the numbers of the original control information bits of the multiple DCI formats.

For example, in an LTE-A system, DCI formats corresponding to downlink large time delay CDD are a DCI format 2A and a DCI format 1A, and DCI formats corresponding to closed-loop space division multiplexing are a DCI format 2 and the DCI format 1A. With the component carrier bandwidths being the same, a difference between the number of the original downlink control information bits of the DCI format 2A and the number of the original downlink control information bits of the DCI format 2 is 0 to 1 bit, and the difference is smaller than a preset value (assuming that the preset value is 4 bits), so the number of the downlink control information bits of the DCI format 2A and the number of the downlink control information bits of the DCI format 2 are the same.

(3) Under current resource configuration conditions, if the difference between the numbers of the original downlink control information bits of multiple DCI formats is smaller than the preset value, the numbers of the downlink control information bits of the multiple DCI formats are the same. The current resource configuration conditions may include, but is not limited to, the following conditions: the component carrier bandwidth and the number of the antennas. The same number of the bits may be the maximum value among the numbers of the original control information bits of the multiple DCI formats.

For example, in an LTE-A system, bandwidths of two downlink component carriers currently capable of being used by the UE are 20 MHz and 5 MHz respectively. The transmission mode of the component carrier with the bandwidth being 20 MHz is downlink single-antenna transmission, and corresponding DCI formats are DCI format 1 and DCI format 1A. The transmission mode of the component carrier with the bandwidth being 5 MHz is downlink closed-loop space division multiplexing, and corresponding DCI formats are DCI format 2 and DCI format 1A. If a difference between the number of the original downlink control information bits of the DCI format 1 corresponding to the bandwidth being 20 MHz and the number of the original downlink control information bits of the DCI format 2 corresponding to the bandwidth being 5 MHz is 0 to 3 bits, which is smaller than the preset value being 4 bits, the number of the downlink control information bits of the DCI format 1 corresponding to the bandwidth being 20 MHz and the number of the downlink control information bits of the DCI format 2 corresponding to the bandwidth being 5 MHz are the same.

(4) The numbers of downlink control information bits of DCI formats corresponding to a same frequency domain resource allocation manner are the same.

The downlink control information of the DCI formats corresponding to the same frequency domain resource allocation manner shall have the same number of the bits. The same number of the bits may be the maximum value among the numbers of the original control information bits of all of the DCI formats corresponding to the same frequency domain resource allocation manner.

The frequency domain resource allocation manners of the system include: a continuous frequency domain resource allocation manner and a discontinuous frequency domain resource allocation manner.

In the step, the UE may determine the number of the information bits of each DCI format currently required to be monitored according to the frequency domain resource allocation manner corresponding to each of the DCI formats currently required to be monitored by the UE. The numbers of the information bits of the DCI formats corresponding to the same frequency domain resource allocation manner are the same.

(5) The numbers of downlink control information bits of DCI formats with the maximum numbers of indicatable transport blocks (Transport Block, TB) being the same are the same.

The transport block is a codeword (codeword). The maximum number of the transport blocks indicatable by each kind of DCI format is fixed, and indication information of bits required by each of the transport blocks is also fixed. For example, each downlink transport block requires 8 bits for indication, and each uplink transport block requires 5 bits for indication.

The DCI formats with the maximum numbers of the indicatable transport blocks being the same must have the same number of the bits. The same number of the bits may be the maximum value among the numbers of the original control information bits of all of the DCI formats with the maximum numbers of the indicatable transport blocks being the same.

Downlink control information corresponding to some DCI formats can schedule only one transport block at most, and the numbers of the downlink control information bits of the DCI formats must be the same. Downlink control information corresponding to some DCI formats can schedule only two transport blocks at most, and the numbers of the downlink control information bits of the DCI formats must be the same.

In this step, the UE may determine the number of the information bits of each DCI format currently required to be monitored according to the maximum number of the TBs indicatable by the DCI of each of the DCI formats currently required to be monitored by the UE. The numbers of the DCI bits of the DCI formats with the maximum numbers of the indicatable TBs being the same are the same.

(6) The numbers of the downlink control information bits of the DCI formats with the frequency domain resource allocation manners being the same and the maximum numbers of the indicatable transport blocks being the same are the same.

The DCI formats with the frequency domain resource allocation manners being the same and the maximum numbers of the indicatable transport blocks being the same must have the same number of the bits. The same number of the bits may be the maximum value among the numbers of the original control information bits of all of the DCI formats meeting the condition.

In this step, the UE may determine the number of the information bits of each DCI format currently required to be monitored according to the frequency domain resource allocation manner adopted by each of the DCI formats currently required to be monitored by the UE and the maximum number of the TBs indicatable by the DCI of each of the DCI formats. The numbers of the DCI bits of the DCI formats with the frequency domain resource allocation manners being the same and the maximum numbers of the indicatable TBs being the same are the same.

(7) Under conditions that the component carrier bandwidths are the same or the component carrier bandwidth levels are the same, the numbers of the downlink control information bits of DCI formats with the frequency domain resource allocation manners being the same and/or the maximum numbers of the indicatable transport blocks being the same are the same.

The same number of the bits may be the maximum value among the numbers of the original control information bits of all DCI formats meeting these conditions.

(8) Under a specific resource configuration condition, the numbers of the information bits of a same DCI format are configured to be only one unique value in a current moment.

The unique value must be configured according to the maximum number of the information bits. For example, the number of the information bits is configured according to the currently supported maximum component carrier bandwidth (the number of the information bits of the DCI format increases as the bandwidth increases) and/or the maximum number of the currently supported antennas (the number of the information bits of the DCI format increases as the number of the antennas increases).

The specific resource configuration condition may include, but is not limited to, the following conditions.

The DCI format adopts the continuous frequency domain resource allocation manner. For example, the DCI format 1A adopts the continuous frequency domain resource allocation, no matter what size the currently configured component carrier bandwidth is, the number of the information bits of the DCI format is configured to be only one unique value in the current moment (configuration is performed according to the currently supported maximum component carrier bandwidth).

A difference between the numbers of the original downlink control information bits of the DCI format under different conditions configured currently is smaller than a preset value. For example, bandwidths of two downlink component carriers currently capable of being used by the UE are 20 MHz and 5 MHz respectively, and both support a DCI format 1B, and if a difference between the number of the downlink control information bits of the DCI format 1B corresponding to the bandwidth being 20 MHz and that of the DCI format 1B corresponding to the bandwidth being 5 MHz is 3 bits (smaller than the preset value being 4 bits), the DCI format 1B is configured to be only one unique value in the current moment (configuration is performed according to the bandwidth being 20 MHz).

(9) The numbers of the information bits of the same DCI format are configured to be only one unique value in the current moment.

The unique value must be configured according to the maximum number of the information bits. For example, the number of the information bits is configured according to the currently supported maximum component carrier bandwidth (the number of the information bits of the DCI format increases as the bandwidth increases) and/or the maximum number of the currently supported antennas (the number of the information bits of the DCI format increases as the number of the antennas increases).

203: The UE determines a temporary search space corresponding to each type of control channel currently required to be monitored by the UE, according to a predefined temporary search space calculation method and the mapping relationship between the component carrier for carrying a control channel and the component carrier for carrying a data channel.

For ease of understanding, a brief illustration of the temporary search space of the component carrier for carrying a control channel is provided first. In a system, each component carrier for carrying a data channel corresponds to one temporary search space, and one or more component carriers for carrying data channels may be mapped to a same component carrier for carrying a control channel, so multiple temporary search spaces may exist on each component carrier for carrying a control channel. Multiple temporary search spaces calculated according to the predefined search space calculation method may be the same or not.

(1) The temporary search space corresponding to each of the component carriers for carrying data channels is determined:

Since the search space is a set of PDCCH candidates required to be monitored by the UE, and the PDCCH is aggregated by CCE(s), in order to determine the temporary search space corresponding to each of the component carriers for carrying data channels, the CCEs for forming the temporary search space $S_{k,d,n}^{(L)}$ are required to be determined, where L is an aggregation level, k is the number of a current sub-frame number, d is an indicator or a sequence number of the component carrier for carrying a control channel, and n is an indicator or a sequence number of the component carrier for carrying a data channel. In the step, the component carrier that is for carrying a control channel and is represented by the component carrier indicator/sequence number d and the component carrier that is for carrying a data channel and is represented by the component carrier indicator/sequence number n have the mapping relationship determined in Step 201.

For example, a formula of CCEs forming the temporary search space $S_{k,d,n}^{(L)}$ is as follows:

$$L\{(Y_k+m) \mod \lfloor N_{CCE,k,d}/L \rfloor\}+i,$$

In the formula, $i=0, \ldots, L-1$ and $m=0, \ldots, M^{(L)}-1$, $M^{(L)}$ is the number of PDCCHs required to be detected when the aggregation level is L. $N_{CCE,k,d}$ is the total number of CCEs used in the $K^{th}$ sub-frame on the component carrier for carrying a control channel with component carrier indicator or sequence number d.

In the formula, $Y_k=(A \cdot Y_{k-1}) \mod D$. $Y_{-1}=F(n_{RNTI}, n) \neq 0$ or, according to the related art, $Y_{-1}=n_{RNTI} \neq 0$. F(k) represents a function, $A=39827$, $D=65537$, $k=\lfloor n_s/2 \rfloor$, $n_s$ is a slot number within a radio frame, and $n_{RNTI}$ is a value of RNTI.

It should be noted that, when the attribute of the component carrier is taken into account, the configuration of $M^{(L)}$ may vary as the attribute of the component carrier changes. For example, when a component carrier for carrying a data channel is a primary carrier, the value of $M^{(L)}$ of a temporary search space corresponding to the component carrier may be different from that of a temporary search space corresponding to a non-primary carrier; or when a component carrier for carrying a control channel is a primary carrier, values of $M^{(L)}$ of all temporary search spaces corresponding to the component carrier may be different from that of a temporary search space corresponding to a non-primary carrier. The primary carrier herein is a component carrier required to be monitored continuously by a UE in a connected state, or a component carrier for a UE to receive paging information (paging) and system broadcast information, and the present invention does not limit characteristics of the primary carrier. Specifically, for example, considering that information sent over a primary carrier is important, the blocking probability of control channel scheduling of a search space corresponding to the primary carrier is intended to be lowered, so when a component carrier for carrying a data channel is a primary carrier, the value of $M^{(L)}$ of a corresponding temporary search space thereof may be greater than that of a temporary search space corresponding to a non-primary carrier.

Figure 5:
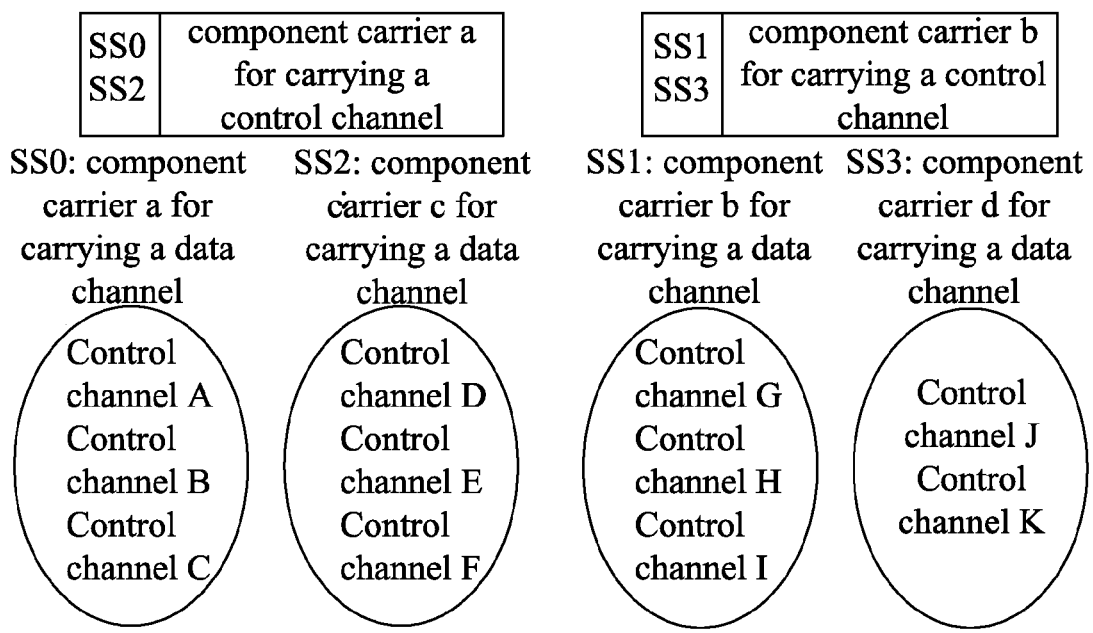
FIG. 5 is a schematic diagram of a temporary search space of a component carrier for carrying a data channel and a DCI format according to an embodiment of the present invention.

(2) The temporary search space corresponding to each type of control channel currently required to be monitored by the UE is determined according to control channels corresponding to a component carrier for carrying a data channel of the UE and a temporary search space corresponding to the component carrier for carrying a data channel. As shown in FIG. 5, the temporary search space of control channel A, control channel B, and control channel C corresponding to component carrier a for carrying a data channel is SS0; a temporary search space of control channel D, control channel E, and control channel F corresponding to component carrier c for carrying a data channel is SS2; the temporary search space of control channel G, control channel H, and control channel I corresponding to component carrier b for carrying a data channel is SS1; and a temporary search space of control channel J and control channel K corresponding to component carrier d for carrying a data channel is SS3. The example herein is only used for illustrating, and the number of the control channels corresponding to each component carrier for carrying a data channel may be greater than 2 or 3.

204: For control channels that are currently required to be monitored by the UE and are of the same CCE aggregation level, when the numbers of the downlink control information bits of one or more other types of control channels are the same as the number of the downlink control information bits of a selected type of control channel, determine that an actual search space corresponding to the selected type of control channel is all CCEs of a union of temporary search spaces corresponding to all or a part of control channels with the same number of the downlink control information bits, or to be a part of the CCEs of the union of the temporary search spaces corresponding to all or a part of the control channels with the same number of the downlink control information bits. The one or more other types of control channels are one or more types of control channels of the control channels that are currently required to be monitored by the UE and are of the same CCE aggregation level except the selected type of control channel. The all or a part of control channels with the same number of the downlink control information bits are all or a part of control channels of a control channel set formed by the one or more other types of control channels and the selected type of control channel.

In order to make the description clear, 2-dimensional elements that form the actual search space are described respectively in the following.

Figure 6:
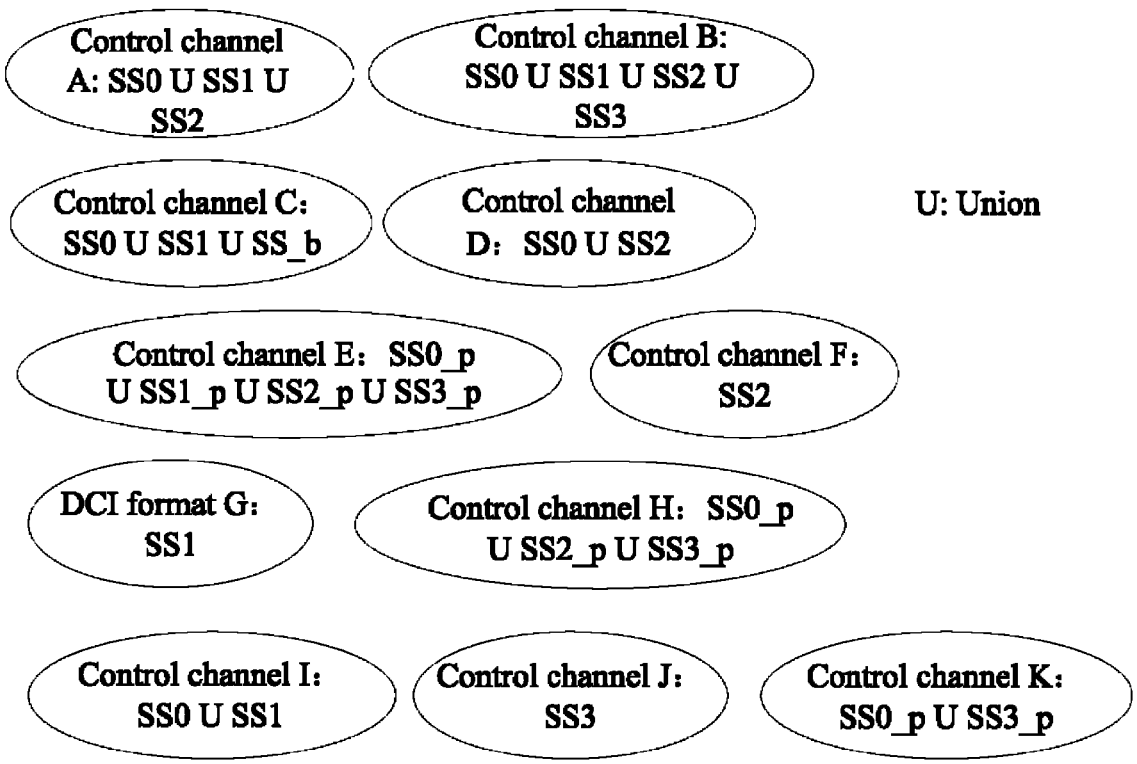
FIG. 6 is a schematic diagram of extending a search space according to an embodiment of the present invention.

A first-dimension formation element is: whether the actual search space is a complete union or a partial union, that is, whether the actual search space is formed by the temporary search spaces corresponding to all of the control channels, or by the temporary search spaces corresponding to a part of the control channels. The complete union refers to that the actual search space corresponding to the selected type of control channel is the union of the temporary search spaces corresponding to all of the control channels with the same number of the downlink control information bits. The partial union refers to that the actual search space corresponding to the selected type of control channel is the union of the temporary search spaces corresponding to a part of the control channels with the same number of the downlink control information bits. The existence of the partial union may be caused by the attributes of one or more component carriers. For example, when a component carrier for carrying a data channel is a primary carrier, and considering that information sent over the primary carrier is important, the blocking probability of control channel scheduling of a search space corresponding to the primary carrier is intended to be lowered, so that the temporary search space corresponding to the primary carrier is not suitable to be shared by other component carriers for carrying data channels. For example, in order that the UE can save power as much as possible or decrease the number of blind decodings, in terms of discontinuous receiving of the UE, the actual search space to be monitored is intended to be concentrated on as few component carriers for carrying control channels as possible, so that some temporary search spaces of the component carriers for carrying control channels may not join the union. Specifically, for example, considering that a primary carrier in the connected state is always required to be monitored, the temporary search spaces to join the union may be only the temporary search spaces of the primary carrier, so that when no data channel is sent on a non-primary carrier for a period of time, the non-primary carrier may enter a dormant state, and may be activated through dynamic signaling of the primary carrier if needed. It should be noted that, the present invention does not limit the causes of the partial union. For example, as shown in FIG. 6, assuming that the component carrier b for carrying a data channel is a primary carrier, and control channels A, D, and G are all control channels that are currently required to be monitored by the UE and are of the same CCE aggregation level and with the same number of the downlink control information bits, the actual search space of the control channel A is enlarged to be SS0, SS1, and SS2, which is a complete union formation manner; in view of decreasing the blocking probability of the control channel scheduling of the search spaces of the primary carrier, the actual search space of control channel D is only enlarged to be SS0 and SS2, which is a partial union formation manner; and considering that the temporary search spaces joining the union are only the temporary search spaces of the primary carrier, the actual search space of control channel G is SS1, which is a partial union formation manner.

A second-dimension formation element is: whether the actual search space is all CCEs of the union of the temporary search spaces or a part of the CCEs of the union of the temporary search spaces. All of the CCEs of the union refer to that the actual search space corresponding to the selected type of control channel is all of the CCEs of the union of the temporary search spaces corresponding to all or a part of the control channels with the same number of the downlink control information bits. That is, each of the temporary search spaces taking part in the formation of the actual search space is complete, and includes all of the CCEs of the temporary search space. The part of the CCEs of the union refer to that the actual search space corresponding to the selected type of control channel is a part of the CCEs of the union of the temporary search spaces corresponding to all or a part of the control channels with the same number of the downlink control information bits. That is, for one or several or all of the temporary search spaces taking part in the formation of the actual search space, only a part of the CCEs of the temporary search spaces join the union. The cause of the actual search space being a part of the CCEs of the union of the temporary search spaces is as follows. When the actual search space is all of the CCEs of the union of the temporary search spaces, since the formed actual search space is too large, in order to decrease the number of the blind decodings on the UE side, the actual search space is required to shrink. For example, when the number of the blind decodings is greater than the maximum number of the blind decodings of the UE or the maximum number of the blind decodings defined by a standard, the actual search space may shrink according to the maximum number of the blind decodings. In addition, the actual search space may also shrink according to a shrinkage ratio (notified by the NodeB or defined by a standard) determined by the system. The shrinkage ratio of each of the temporary search spaces may be the same or not. The present invention does not limit the causes of the actual search space being a part of the CCEs of the union of the temporary search spaces. For example, as shown in FIG. 6, assuming that control channels B, E, H, and K all are control channels that are currently required to be monitored by the UE and are of the same CCE aggregation level and with the same number of the downlink control information bits, the actual search space of control channel B is enlarged to be SS0, SS1, SS2, and SS3, all CCEs included in SS0, SS1, SS2, and SS3 take part in the formation of the actual search space, which is a formation manner in which the actual search space is formed by all of the CCEs of the union of the temporary search spaces; the actual search space of control channel E is enlarged to be SS0_p, SS1_p, SS2_p, and SS3_p, SS0_p is a part of SS0, it is assumed that SS0 includes 12 CCEs, the CCEs included by SS0_p are the first two thirds of the CCEs included by the SS0, that is the first 8 CCEs, and a same operation is performed for SS1_p, SS2_p, and SS3_p, which is a formation manner in which the actual search space is formed by a part of the CCEs of the union of the temporary search spaces; the actual search space of control channel H is enlarged to be SS0_p, SS2_p, and SS3_p, SS0_p is a part of SS0, it is assumed that SS0 includes 12 CCEs, the CCEs included by SS0_p are the first five sixths of the CCEs included by SS0, that is the first 10 CCEs, and a same operation is performed for SS2_p and SS3_p, which is a formation manner in which the actual search space is formed by a part of the CCEs of the union of the temporary search spaces; and the actual search space of control channel K is enlarged to be SS0_p and SS3_p, the SS0_p is a part of SS0, SS3_p is a part of SS3, it is assumed that both SS0 and SS3 include 12 CCEs, the CCEs included by SS0_p are the first half of the CCEs included by SS0, that is the first 6 CCEs, the CCEs included by SS3_p are the first five sixths of the CCEs included by SS0, that is the first 10 CCEs, which is a formation manner in which the actual search space is formed by a part of the CCEs of the union of the temporary search spaces.

In addition, the actual search space corresponding to the selected type of control channel may also be an extended union of the temporary search spaces corresponding to all or a part of the control channels with the same number of the downlink control information bits. The cause of further extension is mainly to further decrease the blocking probability of the PDCCH scheduling. As shown in FIG. 6, assuming that control channels C and I both are control channels that are currently required to be monitored by the UE and are of the same CCE aggregation level and with the same number of the downlink control information bits. The actual search space of control channel C is enlarged to be SS0, SS1, and SS_b, where SS_b is an extended search space, that is, extended CCEs, and for example, 4 CCEs are extended. The actual search space of control channel I is enlarged to be SS0 and SS1.

For the control channels that are currently required to be monitored by the UE and are of the same CCE aggregation level, when the numbers of the downlink control information bits of other control channels are all different from the number of the downlink control information bits of the selected type of control channel, the actual search space corresponding to the selected type of control channel is determined to be the temporary search space corresponding to the selected type of control channel. The other control channels are all of the control channels that are currently required to be monitored by the UE and are of the same CCE aggregation level except the selected type of control channel. The search spaces of the control channels of the different numbers of the downlink control information bits are not formed, so as not to increase the number of the blind decodings of the control channel. For example, as shown in FIG. 6, for the control channels that are currently required to be monitored by the UE and are of the same CCE aggregation level, the number of the downlink control information bits of control channel F is different from those of other control channels, so the actual search space of control channel F is the SS2, which is similar to the case of control channel J.

It should be noted that, the configuration rule of the number of the downlink control information bits is to specify conditions which the DCI formats that must be configured to be of the same number of the downlink control information bits shall meet. For multiple DCI formats used by a UE, a part of the multiple DCI formats may meet the conditions to be configured with the same number of the downlink control information bits; and a DCI format not meeting the conditions may also exist, in which case the actual search space corresponding to the control channel corresponding to the DCI format is the temporary search space corresponding to the control channel.

It should be noted that, the examples related to FIG. 6 are all described based on the examples of FIG. 5.

205: The UE performs blind decoding on the PDCCH in the actual search space corresponding to each type of control channel, according to the actual search space corresponding to each type of control channel currently required to be monitored and the number of the DCI bits of each type of control channel currently required to be monitored, so as to find downlink control information passing CRC.

When the actual search spaces corresponding to multiple control channels with the same number of the downlink control information bits are the same, the NodeB is required to add an information header for identifying a component carrier, that is, carrier indicator (Carrier Identify, CI) bits, to the DCI carried over each type of control channel, or is required to add a different scrambling code to each DCI. The UE distinguishes, according to the carrier indicator bits or the different scrambling code of each DCI, which component carrier for carrying a data channel the found DCI indicates.

According to Embodiment 2 of the present invention, the temporary search space corresponding to the control channel currently required to be monitored by the UE is determined according to the mapping relationship between the component carrier for carrying a data channel and the component carrier for carrying a control channel, so the temporary search spaces of the control channel corresponding to different component carriers for carrying data channels may be different. For the control channels that are currently required to be monitored by the UE and are of the same CCE aggregation level, when the numbers of the downlink control information bits of one or more other types of control channels are the same as the number of the downlink control information bits of the selected type of control channel, the actual search space corresponding to the selected type of control channel is determined to be all of the CCEs of the union of the temporary search spaces corresponding to all or a part of the control channels with the same number of the downlink control information bits, or to be a part of the CCEs of the union of the temporary search spaces corresponding to all or a part of the control channels with the same number of the downlink control information bits. In addition, the temporary search spaces of the control channels corresponding to different component carriers for carrying data channels may be different, so after combining, the search space corresponding to the control channel is enlarged. Therefore in a carrier aggregation system, the blocking probability of control channel scheduling in the actual search space corresponding to the control channel is decreased, and the number of the blind decodings of the control channel on the UE side is not increased.

Embodiment 3

Figure 7:
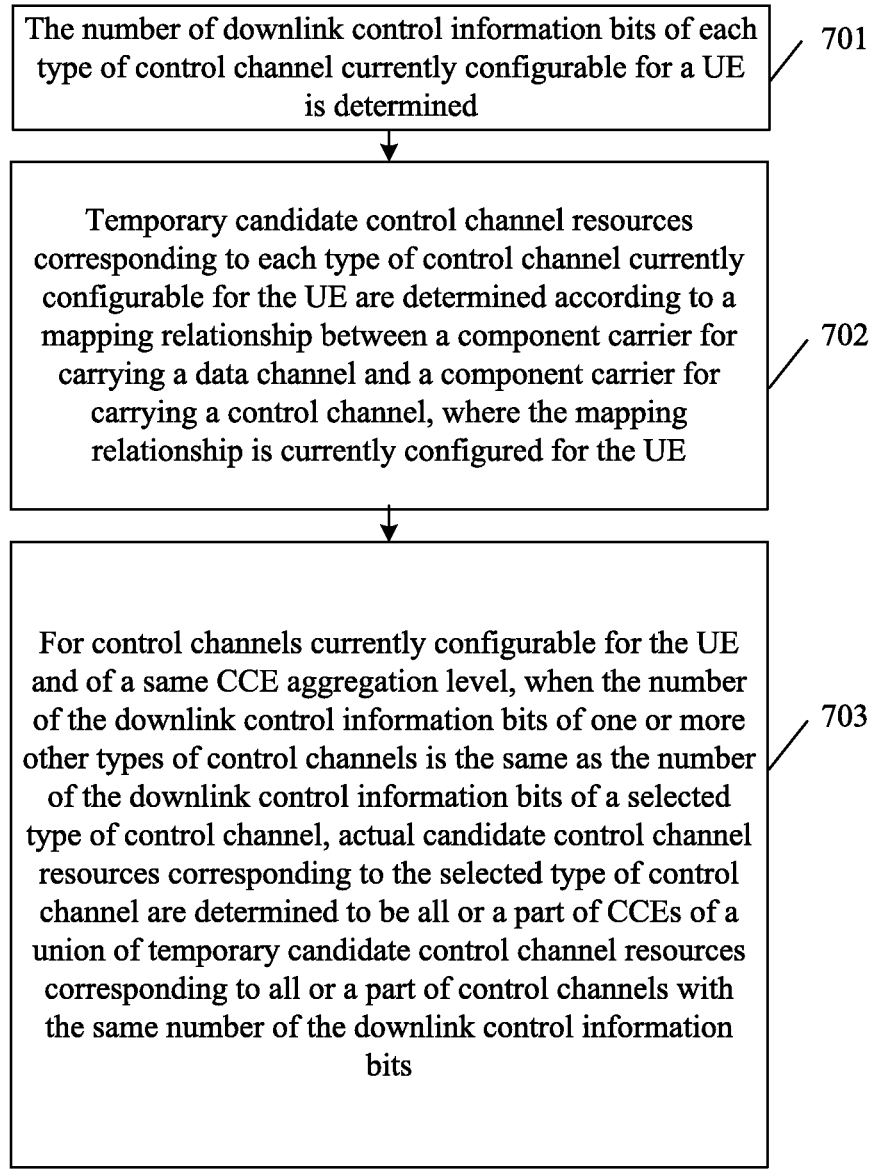
FIG. 7 is a flow chart of a method for determining candidate control channel resources according to Embodiment 3 of the present invention.

Referring to FIG. 7, according to the embodiment of the present invention, a method for determining candidate control channel resources is provided, where the method includes:

701: Determine the number of downlink control information bits of each type of control channel currently configurable for a UE.

The number of the downlink control information bits of each type of control channel currently configurable for the UE may be determined according to a configuration rule of the number of the downlink control information bits and a format of the DCI carried by each type of control channel currently configurable for the UE. The configuration rule of the number of the downlink control information bits is the rule specifying that the numbers of the downlink control information bits of multiple DCI formats are the same. The numbers of the original downlink control information bits of the multiple DCI formats may not be the same. The rule specifies in which cases the numbers of the downlink control information bits of the DCI formats must be configured to be the same. Specifically, the numbers of the downlink control information bits of the DCI formats may be configured to be the same by adding redundant information bits or additional useful information bits.

The configuration rule of the number of the downlink control information bits includes at least one of the following rules.

The numbers of the downlink control information bits of the DCI formats corresponding to a same frequency domain resource allocation manner are the same.

The numbers of the downlink control information bits of the DCI formats with frequency domain resource allocation manners being the same and the maximum numbers of indicatable transport blocks being the same are the same.

Under different resource conditions configured currently, if a difference between the numbers of the downlink control information bits corresponding to a same DCI format is smaller than a preset value, the numbers of the downlink control information bits of the DCI format are configured to be a unique value.

702: Determine temporary candidate control channel resources corresponding to each type of control channel currently configurable for the UE, according to a mapping relationship between a component carrier for carrying a data channel and a component carrier for carrying a control channel, where the mapping relationship is currently configured for the UE.

The component carrier for carrying a control channel is a component carrier of a first carrier set, and the component carrier for carrying a data channel is a component carrier of a second carrier set. For the first carrier set, the second carrier set, and relevant descriptions, reference may be made to step 102 in Embodiment 1.

The mapping relationship between the component carrier for carrying a data channel and the component carrier for carrying a control channel, where the mapping relationship is currently configurable for the UE, may be a one-to-one relationship or a many-to-one relationship, and for relevant descriptions, reference may be made to step 102 in Embodiment 1.

In the step, the mapping relationship between the component carrier for carrying a data channel and the component carrier for carrying a control channel, where the mapping relationship is currently configurable for the UE, may be predefined by a standard. Alternatively, before the step, a NodeB selects a mapping relationship from multiple mapping relationships between the component carriers for carrying data channels and the component carriers for carrying control channels, where the mapping relationship is currently configurable for the UE. In order to make the UE and the NodeB adopt a same mapping relationship, the NodeB sends first mapping relationship indication information to the UE. The first mapping relationship indication information is used to indicate a mapping relationship selected by the NodeB from the multiple mapping relationships between the component carriers for carrying data channels and the component carriers for carrying control channels, where the mapping relationships are currently configurable for the UE. The mapping relationship predefined by a standard is a mapping relationship defined by a communication standard or protocol.

Alternatively, before the step, according to the mapping rule predefined by a standard, the NodeB determines the types of the mapping relationship currently configurable, and selects a mapping relationship. The mapping rule predefined by a standard is a mapping rule defined by a communication standard or protocol. In order to guarantee that the UE and the NodeB adopt a same mapping relationship, the NodeB sends second mapping relationship indication information to the UE. The second mapping relationship indication information is used to indicate a mapping relationship between a component carrier for carrying a data channel and a component carrier for carrying a control channel, where the mapping relationship is currently configured for the UE, under the mapping rule predefined by a standard.

The mapping rule includes at least one of the following rules. When a component carrier for carrying a data channel can carry a control channel, the component carrier for carrying a data channel and a mapped component carrier thereof for carrying a control channel are the same component carrier.

When a downlink component carrier paired with an uplink component carrier for carrying a data channel can carry a control channel, the uplink component carrier for carrying a data channel and a mapped component carrier thereof for carrying a control channel are component carriers of a same component carrier pair.

Component carriers of different component carrier bandwidth levels for carrying data channels cannot be mapped to a same component carrier for carrying a control channel.

Component carriers of different transmission modes for carrying data channels cannot be mapped to a same component carrier for carrying a control channel.

Component carriers of different frequency bands for carrying data channels cannot be mapped to a same component carrier for carrying a control channel.

703: For control channels that are currently configurable for the UE and are of the same CCE aggregation level, when the numbers of the downlink control information bits of one or more other types of control channels are the same as the number of the downlink control information bits of a selected type of control channel, determine that actual candidate control channel resources corresponding to the selected type of control channel are all CCEs of a union of temporary candidate control channel resources corresponding to all or a part of control channels with the same number of the downlink control information bits, or to be a part of the CCEs of the union of the temporary candidate control channel resources corresponding to all or a part of the control channels with the same number of the downlink control information bits. The one or more other types of control channels are one or more of the control channels that are currently configurable for the UE and are of the same CCE aggregation level except the selected type of control channel. The all or a part of control channels with the same number of the downlink control information bits are all or a part of control channels of a control channel set formed by the one or more other types of control channels and the selected type of control channel.

According to Embodiment 3 of the present invention, the temporary candidate control channel resources corresponding to the control channel currently configurable for the UE are determined according to the mapping relationship between the component carrier for carrying a data channel and the component carrier for carrying a control channel, so the temporary candidate control channel resources of the control channel corresponding to different component carriers for carrying data channels may be different. For the control channels that are currently configurable for the UE and are of the same CCE aggregation level, when the numbers of the downlink control information bits of one or more other types of control channels are the same as the number of the downlink control information bits of the selected type of control channel, the actual candidate control channel resources corresponding to the selected type of control channel are determined to be all of the CCEs of the union of the temporary candidate control channel resources corresponding to all or a part of the control channels with the same number of the downlink control information bits, or to be a part of the CCEs of the union of the temporary candidate control channel resources corresponding to all or a part of the control channels with the same number of the downlink control information bits. In addition, the temporary candidate control channel resources of the control channels corresponding to different component carriers for carrying data channels may be different, so after combining, the candidate control channel resources corresponding to the control channel are enlarged. Therefore in a carrier aggregation system, the blocking probability of control channel scheduling in the actual candidate control channel resources corresponding to the control channel is decreased.

Embodiment 4

Figure 8:
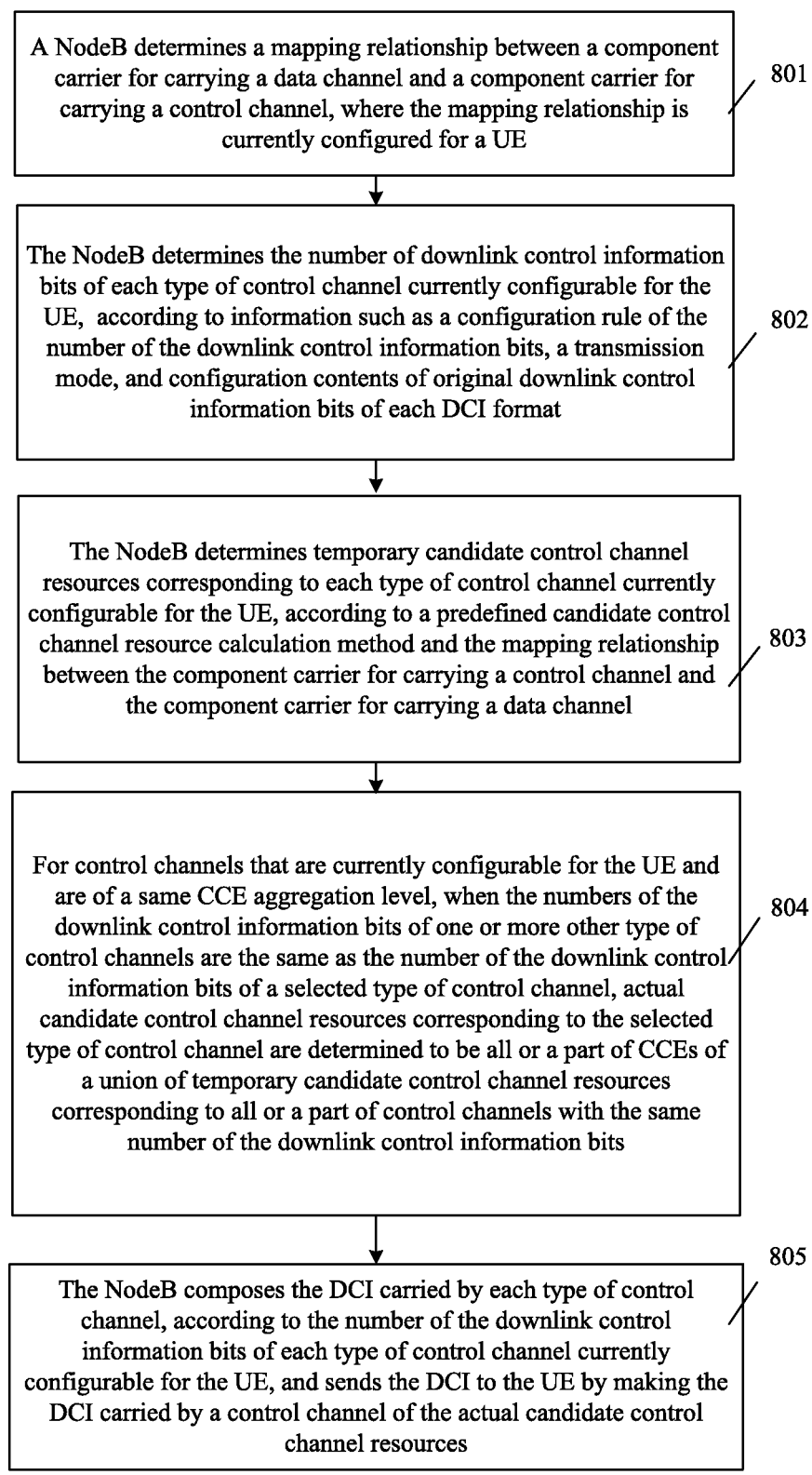
FIG. 8 is a schematic diagram of a method for sending downlink control information according to Embodiment 4 of the present invention.

Referring to FIG. 8, according to Embodiment 4 of the present invention, a method for sending downlink control information is provided. For the method, determining of candidate control channel resources corresponding to a control channel is mainly described in terms of a NodeB side, where the method includes:

801: A NodeB determines a mapping relationship between a component carrier for carrying a data channel and a component carrier for carrying a control channel, where the mapping relationship is currently configured for a UE.

Specifically, the determining, by the NodeB, the mapping relationship between the component carrier for carrying a data channel and the component carrier for carrying a control channel, where the mapping relationship is currently configured for the UE, may be performed in the following manners.

A first manner is as follows. The mapping relationship between the component carrier for carrying a data channel and the component carrier for carrying a control channel may be predefined by a standard. In the step, the NodeB determines, according to the mapping relationship predefined by a standard, which component carrier of a first carrier set each component carrier of a second carrier set is mapped to (that is, corresponds to). The mapping relationship predefined by a standard is a mapping relationship defined by a communication standard or protocol. A function relationship between the component carrier for carrying a data channel and the component carrier for carrying a control channel may be predefined, and reference may be made to relevant descriptions of step 201 of Embodiment 2, which is not repeated here.

A second manner is as follows. Multiple, for example N, mapping relationships are currently configurable for the UE, and the NodeB selects one. In order to guarantee that the UE and the NodeB adopt a same mapping relationship, the NodeB sends first mapping relationship indication information to the UE through semi-static signaling or dynamic signaling. The first mapping relationship indication information is used to indicate a mapping relationship selected by the NodeB from the multiple mapping relationships between the component carriers for carrying data channels and the component carriers for carrying control channels, where the mapping relationships are currently configurable for the UE.

A third manner is as follows. A standard predefines one or more mapping rules between component carriers for carrying data channels and component carriers for carrying control channels. The mapping rules may be the four mapping rules described in Embodiment 2. The NodeB determines, according to the mapping rule predefined by a standard, the type of mapping relationship currently configurable, and the NodeB may select one mapping relationship. In order to guarantee that the UE and the NodeB adopt a same mapping relationship, in the step, the NodeB sends the second mapping relationship indication information to the UE, where the second mapping relationship indication information is used to indicate the mapping relationship between the component carrier for carrying a data channel and the component carrier for carrying a control channel, where the mapping relationship is used by the UE under the mapping rule predefined by a standard. The mapping rule predefined by a standard is a mapping rule defined by a communication standard or protocol.

802: The NodeB may determine the number of downlink control information bits of each type of control channel currently configurable for the UE, according to information such as a configuration rule of the number of the downlink control information bits, a transmission mode, a component carrier bandwidth, the number of transmission antennas, and configurations of original downlink control information bits of each kind of DCI format, and may also inform the UE of information such as the transmission mode, the component carrier bandwidth, and the number of transmission antennas, so that the UE acquires the number of the downlink control information bits of each type of control channel required to be monitored by the UE according to the information.

Specific steps of determining the number of the downlink control information bits of each type of control channel currently configurable for the UE are similar to the three steps described in 202 of Embodiment 2, and are not repeated hereinafter.

The configuration rule of the number of the downlink control information bits is a rule specifying that the numbers of the downlink control information bits of multiple DCI formats are the same. The rule may be predefined by a standard, that is, the standard-predefined configuration rule of the number of the downlink control information bits is a rule defined by a communication standard or protocol. Alternatively, the NodeB informs the UE of the currently used configuration rule of the number of the downlink control information bits.

The configuration rule of the number of the downlink control information bits may include at least one of the following rules.

(1) The number of downlink control information bits of a DCI format corresponding to an uplink component carrier for carrying a data channel and the number of downlink control information bits of a DCI format corresponding to a downlink component carrier for carrying a data channel are the same, where the uplink component carrier and the downlink component carrier have a same transmission mode.

When the transmission mode of the uplink component carrier and the transmission mode of the downlink component carrier, where the transmission modes are currently configured by the NodeB, are the same, the number of the downlink control information bits of the DCI format corresponding to the uplink component carrier and the number of the downlink control information bits of the DCI format corresponding to the downlink component carrier are the same.

(2) Under conditions that the component carrier bandwidths are the same and the component carrier bandwidth levels are the same, if a difference between the numbers of original downlink control information bits of multiple DCI formats is smaller than a preset value, the numbers of the downlink control information bits of the multiple DCI formats are the same.

(3) If under current resource configuration conditions, the difference between the numbers of original downlink control information bits of multiple DCI formats is smaller than the preset value, the numbers of the downlink control information bits of the multiple DCI formats are the same. The current resource configuration conditions may include, but is not limited to, the following conditions: the component carrier bandwidth and the number of the antennas.

(4) The numbers of downlink control information bits of DCI formats corresponding to a same frequency domain resource allocation manner are the same.

In the step, the NodeB determines the number of the information bits of each DCI format currently configurable, according to the frequency domain resource allocation manners corresponding to each of the DCI formats currently configurable for the UE. The numbers of the information bits of the DCI formats corresponding to the same frequency domain resource allocation manner are the same.

(5) The numbers of downlink control information bits of DCI formats with the maximum numbers of indicatable transport blocks being the same are the same.

In this step, the NodeB determines the number of the information bits of each DCI format currently configurable according to the maximum number of the transport blocks indicatable by the downlink control information of each of the DCI formats currently configurable for the UE. The numbers of the downlink control information bits of the DCI formats with the maximum numbers of the indicatable transport blocks being the same are the same.

(6) The numbers of downlink control information bits of DCI formats with frequency domain resource allocation manners being the same and the maximum numbers of indicatable transport blocks being the same are the same.

In the step, the NodeB determines the number of the information bits of each DCI format currently configurable, according to the frequency domain resource allocation manner adopted by each of the DCI formats currently configurable and the maximum number of the transport blocks indicatable by the downlink control information of each of the DCI formats. The numbers of the downlink control information bits of the DCI formats with the frequency domain resource allocation manners being the same and the maximum numbers of the indicatable transport blocks being the same are the same.

(7) Under a condition that component carrier bandwidths are the same or component carrier bandwidth levels are the same, the numbers of the downlink control information bits of DCI formats with the frequency domain resource allocation manners being the same and/or the maximum numbers of the indicatable transport blocks being the same are the same.

(8) Under a specific resource configuration condition, the numbers of information bits of a same DCI format are configured to be only one unique value in the current moment.

The unique value must be configured according to the maximum number of the information bits.

The specific resource configuration condition may include, but is not limited to, the following conditions. The DCI format adopts a continuous frequency domain resource allocation manner; and a difference between the numbers of the original downlink control information bits of the DCI format under different conditions configured currently is smaller than a preset value.

(9) The numbers of information bits of a same DCI format are configured to be only one unique value in the current moment.

803: The NodeB determines temporary candidate control channel resources corresponding to each type of control channel currently configurable for the UE, according to a predefined candidate control channel resource calculation method and the mapping relationship between the component carrier for carrying a control channel and the component carrier for carrying a data channel.

The manner of the determining the temporary candidate control channel resources in the step is similar to the implementation manner of the determining the temporary search space in step 203 in Embodiment 2, and is not repeated hereinafter.

804: For control channels that are currently configurable for the UE and are of the same CCE aggregation level, when the numbers of the downlink control information bits of one or more other types of control channels are the same as the number of the downlink control information bits of a selected type of control channel, determine that actual candidate control channel resources corresponding to the selected type of control channel are all CCEs of a union of temporary candidate control channel resources corresponding to all or a part of control channels with the same number of the downlink control information bits, or to be a part of the CCEs of the union of the temporary candidate control channel resources corresponding to all or a part of the control channels with the same number of the downlink control information bits. The one or more other types of control channels are one or more types of control channels of the control channels that are currently configurable for the UE and are of the same CCE aggregation level except the selected type of control channel. The all or a part of control channels with the same number of the downlink control information bits are all or a part of control channels of a control channel set formed by the one or more other types of control channels and the selected type of control channel.

In order to make the description clear, 2-dimensional elements that form the actual candidate control channel resources are described respectively in the following.

A first-dimension formation element is: whether the actual candidate control channel resources are a complete union or a partial union, that is, whether the actual candidate control channel resources are formed by the temporary candidate control channel resources corresponding to all of the control channels, or by the temporary candidate control channel resources corresponding to a part of the control channels. The complete union refers to that the actual candidate control channel resources corresponding to the selected type of control channel are the union of the temporary candidate control channel resources corresponding to all of the control channels with the same number of the downlink control information bits. The partial union refers to that the actual candidate control channel resources corresponding to the selected type of control channel are the union of the temporary candidate control channel resources corresponding to a part of the control channels with the same number of the downlink control information bits. The existence of the partial union may be caused by the attributes of one or more component carriers.

A second-dimension formation element is: whether the actual candidate control channel resources are all CCEs of the union of the temporary candidate control channel resources or a part of the CCEs of the union of the temporary candidate control channel resources. All of the CCEs of the union refer to that the actual candidate control channel resources corresponding to the selected type of control channel are all of the CCEs of the union of the temporary candidate control channel resources corresponding to all or a part of the control channels with the same number of the downlink control information bits. That is, each of the temporary candidate control channel resources taking part in the formation of the actual candidate control channel resources is complete, and includes all of the CCEs of the temporary candidate control channel resource. The part of the CCEs of the union refer to that the actual candidate control channel resources corresponding to the selected type of control channel is a part of the CCEs of the union of the temporary candidate control channel resources corresponding to all or a part of the control channels with the same number of the downlink control information bits. That is, for one or several or all of the temporary candidate control channel resources taking part in the formation of the actual candidate control channel resources, only a part of the CCEs of the temporary candidate control channel resources join the union. The cause of the actual candidate control channel resources being a part of the CCEs of the union of the temporary candidate control channel resources is as follows. When the actual candidate control channel resources are all of the CCEs of the union of the temporary candidate control channel resources, since the formed actual candidate control channel resources are too large, in order to decrease the number of blind decodings on the UE side, the actual candidate control channel resources are required to shrink.

In addition, the actual candidate control channel resources corresponding to the selected type of control channel may also be an extended union of the temporary candidate control channel resources corresponding to all or a part of the control channels with the same number of the downlink control information bits. The cause of further extension is mainly to further decrease the blocking probability of the PDCCH scheduling.

For the control channels that are currently configurable for the UE and are of the same CCE aggregation level, when the numbers of the downlink control information bits of other control channels are all different from the number of the downlink control information bits of the selected type of control channel, the actual candidate control channel resources corresponding to the selected type of control channel are determined to be the temporary candidate control channel resources corresponding to the selected type of control channel. The other control channels are all of the control channels that are currently configurable for the UE and are of the same CCE aggregation level except the selected type of control channel. The candidate control channel resources of the control channels of the different numbers of the downlink control information bits are not formed, so as not to increase the number of the blind decodings of the control channel.

805: According to the number of the downlink control information bits of each type of control channel currently configurable for the UE, the NodeB composes the DCI carried over each type of control channel and sends the DCI to the UE by making the DCI carried over a control channel of the actual candidate control channel resources.

When the NodeB composes the DCI carried over each type of control channel, and when the number of the downlink control information bits of the control channel determined in step 802 is greater than the number of the original downlink control information bits of the control channel, useful information bits or redundant information bits may be added to the additional bits.

When the actual candidate control channel resources corresponding to multiple control channels with the same number of the downlink control information bits are the same, the DCI carried over each type of control channel is added with carrier indicator bits or a different scrambling code, so that the UE distinguishes which component carrier for carrying a data channel the found DCI indicates.

According to Embodiment 4 of the present invention, the temporary candidate control channel resources corresponding to the control channel currently configurable for the UE are determined according to the mapping relationship between the component carrier for carrying a data channel and the component carrier for carrying a control channel, so the temporary candidate control channel resources of the control channels corresponding to different component carriers for carrying data channels may be different. For the control channels that are currently configurable for the UE and are of the same CCE aggregation level, when the numbers of the downlink control information bits of one or more other types of control channels are the same as the number of the downlink control information bits of the selected type of control channel, the actual candidate control channel resources corresponding to the selected type of control channel are determined to be all of the CCEs of the union of the temporary candidate control channel resources corresponding to all or a part of the control channels with the same number of the downlink control information bits, or to be a part of the CCEs of the union of the temporary candidate control channel resources corresponding to all or a part of the control channels with the same number of the downlink control information bits. In addition, the temporary candidate control channel resources of the control channels corresponding to different component carriers for carrying data channels may be different, so after combining, the candidate control channel resources corresponding to the control channel are enlarged. Therefore in a carrier aggregation system, the blocking probability of control channel scheduling in the actual candidate control channel resources corresponding to the control channel is decreased.

Embodiment 5

Figure 9A:
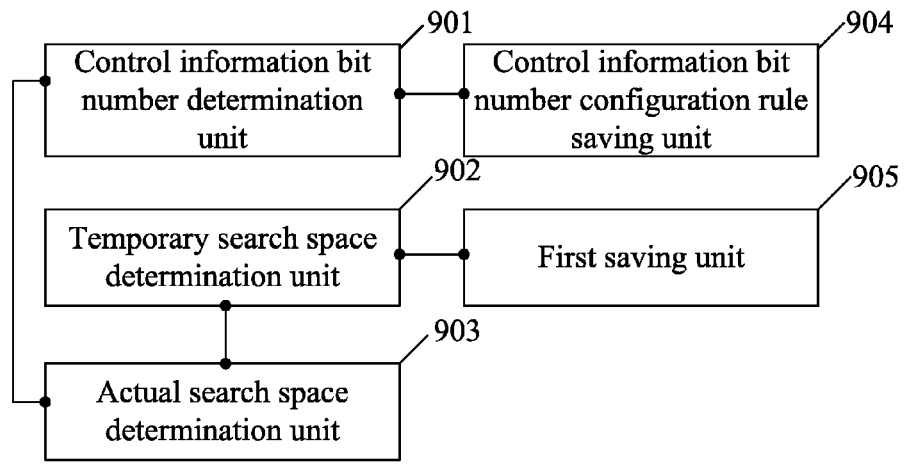
FIG. 9A is a structural diagram of a user equipment according to Embodiment 5 of the present invention.
Figure 9B:
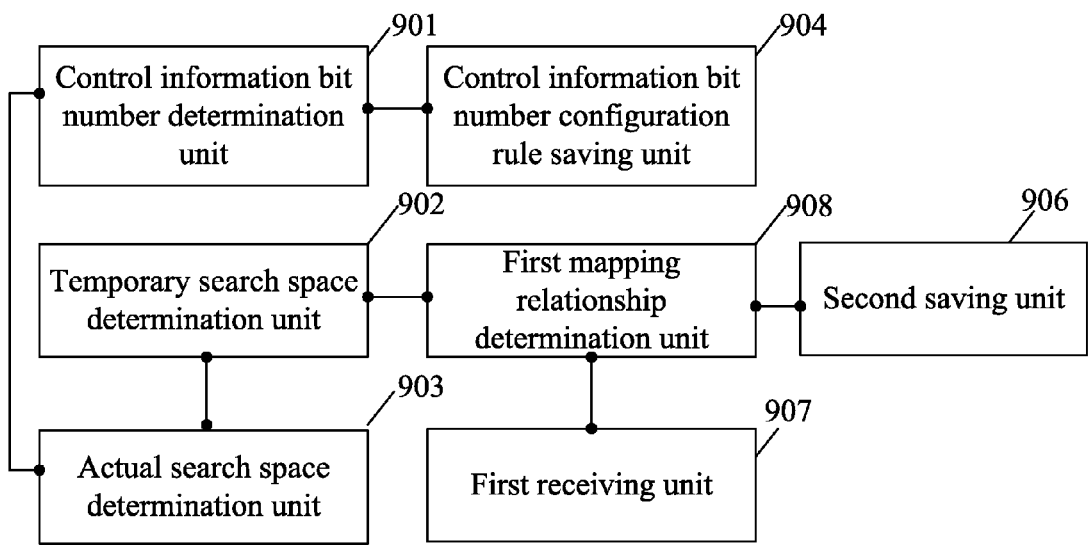
FIG. 9B is another structural diagram of a user equipment according to Embodiment 5 of the present invention.

Referring to FIGS. 9A, 9B, and/or 9C, according to Embodiment 5 of the present invention, a user equipment is provided, including a control information bit number determination unit 901, configured to determine the number of downlink control information bits of each type of control channel currently required to be monitored by the UE, a temporary search space determination unit 902, configured to determine a temporary search space corresponding to each type of control channel currently required to be monitored by the UE, according to a mapping relationship between a component carrier for carrying a data channel and a component carrier for carrying a control channel, where the mapping relationship is currently used by the UE, and an actual search space determination unit 903, configured to determine that an actual search space corresponding to a selected type of control channel is all CCEs of a union of temporary search spaces corresponding to all or a part of control channels with the same number of the downlink control information bits, or to be a part of the CCEs of the union of the temporary search spaces corresponding to all or a part of the control channels with the same number of the downlink control information bits, for control channels of a same CCE aggregation level, when the numbers of the downlink control information bits of other control channels are the same as the number of the downlink control information bits of the selected type of control channel, where the one or more other types of control channels are one or more types of control channels of the control channels that are currently required to be monitored by the UE and are of the same CCE aggregation level except the selected type of control channel; and the all or a part of control channels with the same number of the downlink control information bits are all or a part of control channels of a control channel set formed by the one or more other types of control channels and the selected type of control channel.

The actual search space determination unit 903 is further configured to determine that the actual search space corresponding to the selected type of control channel is the temporary search space corresponding to the selected type of control channel, for the control channels of the same CCE aggregation level, when the numbers of the downlink control information bits of other control channels are all different from the number of the downlink control information bits of the selected type of control channel.

Preferably, the UE further includes: a control information bit number configuration rule saving unit 904, configured to save a configuration rule of the number of the downlink control information bits. The configuration rule of the number of the downlink control information bits is a rule specifying that the numbers of the downlink control information bits of multiple DCI formats are the same. The control information bit number determination unit 901 is configured to determine the number of the downlink control information bits of each type of control channel currently required to be monitored by the UE, according to the configuration rule of the number of the downlink control information bits and a format of the DCI carried over each type of control channel currently required to be monitored by the UE.

Preferably, as shown in FIG. 9A, the user equipment further includes: a first saving unit 905 configured to save a mapping relationship between a component carrier for carrying a data channel and a component carrier for carrying a control channel, where the mapping relationship is used by the user equipment. In this case, the temporary search space determination unit 902 is configured to determine a temporary search space corresponding to each type of control channel currently required to be monitored by the UE, according to the mapping relationship between the component carrier for carrying a data channel and the component carrier for carrying a control channel, where the mapping relationship is used by the user equipment and saved by the first saving unit 905.

Alternatively, as shown in FIG. 9B, the user equipment further includes a second saving unit 906, configured to save multiple mapping relationships between component carriers for carrying data channels and component carriers for carrying control channels, where the mapping relationships are currently capable of being used by the UE; a first receiving unit 907, configured to receive first mapping relationship indication information sent by a NodeB, where the first mapping relationship indication information is used to indicate a mapping relationship selected by the NodeB from the multiple mapping relationships between the component carriers for carrying data channels and the component carriers for carrying control channels, where the mapping relationships are currently capable of being used by the UE; and a first mapping relationship determination unit 908, configured to determine, according to the multiple mapping relationships saved by the second saving unit 906 and the first mapping relationship indication information, the mapping relationship between the component carrier for carrying a data channel and the component carrier for carrying a control channel, where the mapping relationship is currently used by the UE. In this case, the temporary search space determination unit 902 is configured to determine the temporary search space corresponding to each type of control channel currently required to be monitored by the UE, according to the mapping relationship between the component carrier for carrying a data channel and the component carrier for carrying a control channel, where the mapping relationship is currently used by the UE and is determined by the first mapping relationship determination unit 908.

Figure 9C:
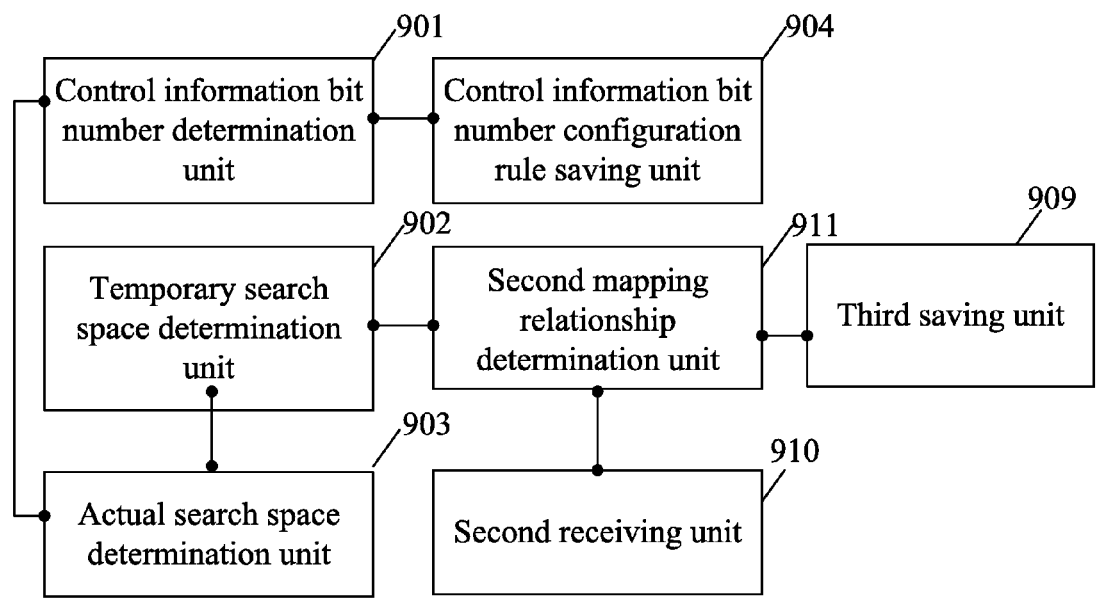
FIG. 9C is yet another structural diagram of a user equipment according to Embodiment 5 of the present invention.

Alternatively, as shown in FIG. 9C, the UE further includes: a third saving unit 909, configured to save a mapping rule, where the mapping rule includes at least one of the following rules: when a component carrier for carrying a data channel can carry a control channel, the component carrier for carrying a data channel and a mapped component carrier thereof for carrying a control channel are the same component carrier; when a downlink component carrier paired with an uplink component carrier for carrying a data channel can carry a control channel, the uplink component carrier for carrying a data channel and a mapped component carrier thereof for carrying a control channel are component carriers of a same component carrier pair; component carriers of different component carrier bandwidth levels for carrying data channels cannot be mapped to a same component carrier for carrying a control channel; component carriers of different transmission modes for carrying data channels cannot be mapped to a same component carrier for carrying a control channel; and component carriers of different frequency bands for carrying data channels cannot be mapped to a same component carrier for carrying a control channel; a second receiving unit 910, configured to receive second mapping relationship indication information sent by the NodeB, where the second mapping relationship indication information is used to indicate a mapping relationship between a component carrier for carrying a data channel and a component carrier for carrying a control channel, where the mapping relationship is currently used by the UE under the mapping rule predefined by a standard; and a second mapping relationship determination unit 911 configured to determine, according to the mapping rule saved by the third saving unit 909, multiple mapping relationships between component carriers for carrying data channels and component carriers for carrying control channels, where the mapping relationships are currently capable of being used under the mapping rule, and determine, according to the multiple mapping relationships and the second mapping relationship indication information, a mapping relationship between a component carrier for carrying a data channel and a component carrier for carrying a control channel, where the mapping relationship is currently used by the UE. In this case, the temporary search space determination unit 902 is configured to determine the temporary search space corresponding to each type of control channel currently required to be monitored by the UE according to the mapping relationship between the component carrier for carrying a data channel and the component carrier for carrying a control channel, where the mapping relationship is currently used by the UE and is determined by the second mapping relationship determination unit 911.

According to Embodiment 5 of the present invention, the temporary search space corresponding to the control channel currently required to be monitored by the UE is determined according to the mapping relationship between the component carrier for carrying a data channel and the component carrier for carrying a control channel, so the temporary search spaces of the control channel corresponding to different component carriers for carrying data channels may be different. For the control channels that are currently required to be monitored by the UE and are of the same CCE aggregation level, when the numbers of the downlink control information bits of one or more other types of control channels are the same as the number of the downlink control information bits of the selected type of control channel, the actual search space corresponding to the selected type of control channel is determined to be all of the CCEs of the union of the temporary search spaces corresponding to all or a part of the control channels with the same number of the downlink control information bits, or to be a part of the CCEs of the union of the temporary search spaces corresponding to all or a part of the control channels with the same number of the downlink control information bits. In addition, the temporary search spaces of the control channels corresponding to different component carriers for carrying data channels may be different, so after combining, the search space corresponding to the control channel is enlarged. Therefore in a carrier aggregation system, the blocking probability of control channel scheduling in the actual search space corresponding to the control channel is decreased, and the number of blind decodings of the control channel on the UE side is not increased.

Embodiment 6

Figure 10A:
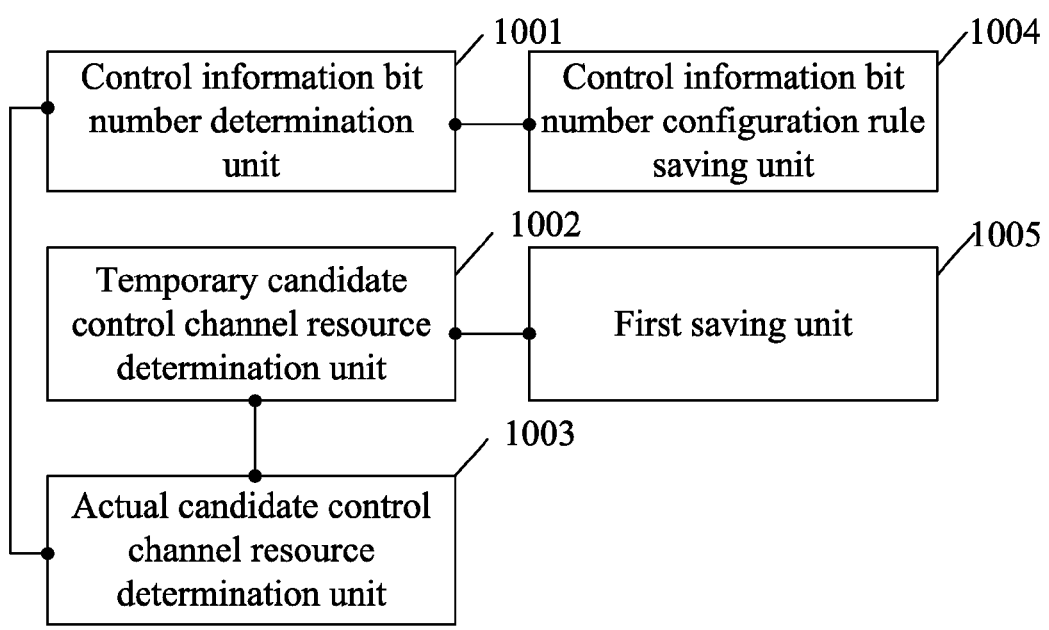
FIG. 10A is a structural diagram of a NodeB according to Embodiment 6 of the present invention.
Figure 10B:
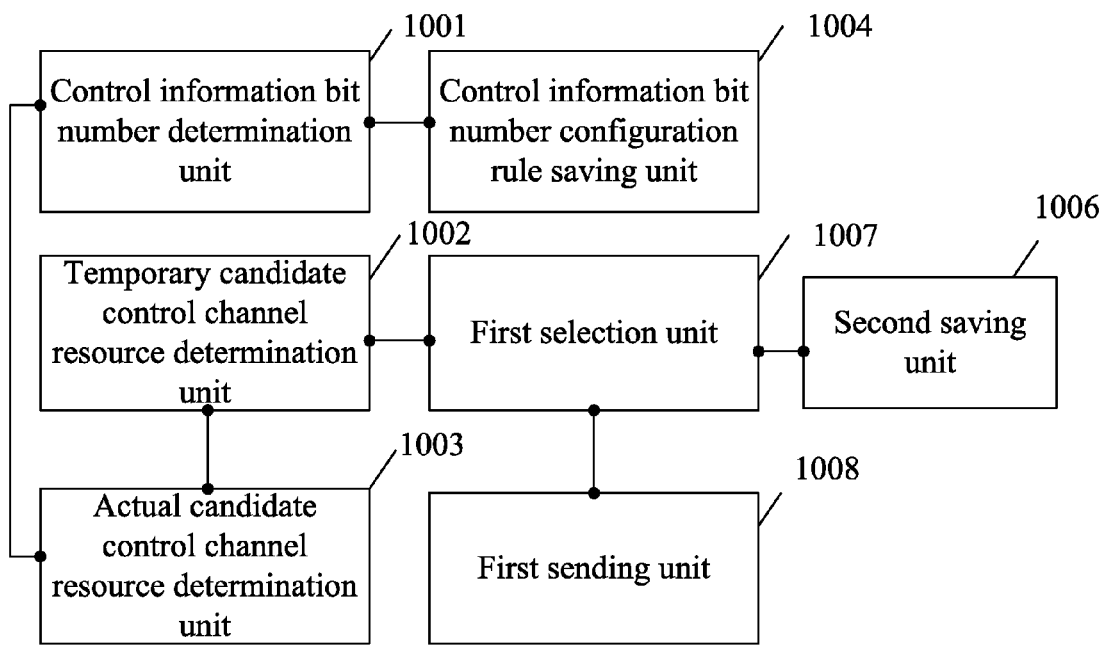
FIG. 10B is another structural diagram of a NodeB according to Embodiment 6 of the present invention.

Referring to FIGS. 10A, 10B, and/or 10C, according to Embodiment 6 of the present invention, a NodeB is provided, including a control information bit number determination unit 1001, configured to determine the number of downlink control information bits of each type of control channel currently configurable for a UE, a temporary candidate control channel resource determination unit 1002, configured to determine temporary candidate control channel resources corresponding to each type of control channel currently configurable for the UE, according to a mapping relationship between a component carrier for carrying a data channel and a component carrier for carrying a control channel, where the mapping relationship is currently configured for the UE, and an actual candidate control channel resource determination unit 1003, configured to determine that actual candidate control channel resources corresponding to a selected type of control channel is all CCEs of a union of temporary candidate control channel resources corresponding to all or a part of control channels with the same number of the downlink control information bits, or a part of the CCEs of the union of the temporary candidate control channel resources corresponding to all or a part of the control channels with the same number of the downlink control information bits, when for control channels of a same CCE aggregation level, the numbers of the downlink control information bits of other control channels are the same as the number of the downlink control information bits of the selected type of control channel. The one or more other types of control channels are one or more types of control channels of the control channels that are currently configurable for the UE and are of the same CCE aggregation level except the selected type of control channel.

The all or a part of control channels with the same number of the downlink control information bits are all or a part of control channels of a control channel set formed by the one or more other types of control channels and the selected type of control channel.

The actual candidate control channel resource determination unit 1003 is further configured to determine that the actual candidate control channel resources corresponding to the selected type of control channel is the temporary candidate control channel resources corresponding to the selected type of control channel, for the control channels of the same CCE aggregation level, when the numbers of the downlink control information bits of other control channels are all different from the number of the downlink control information bits of the selected type of control channel.

Preferably, the NodeB further includes: a control information bit number configuration rule saving unit 1004, configured to save a configuration rule of the number of the downlink control information bits, where the configuration rule of the number of the downlink control information bits is a rule specifying that the numbers of the downlink control information bits of multiple DCI formats are the same. The control information bit number determination unit 1001 is configured to determine the number of downlink control information bits of each type of control channel currently configurable for the UE, according to the configuration rule of the number of the downlink control information bits and a format of the DCI carried over each type of control channel currently configurable for the UE.

Preferably, as shown in 10A, the NodeB further includes a first saving unit 1005, configured to save a mapping relationship between a component carrier for carrying a data channel and a component carrier for carrying a control channel, where the mapping relationship is configured for the user equipment. In this case, the temporary candidate control channel resource determination unit 1002 is configured to determine the temporary candidate control channel resources corresponding to each type of control channel currently configurable for the UE, according to the mapping relationship between the component carrier for carrying a data channel and the component carrier for carrying a control channel, where the mapping relationship is configurable for the user equipment and saved by the first saving unit.

Preferably, as shown in FIG. 10B, the NodeB further includes a second saving unit 1006, configured to save multiple mapping relationships between component carriers for carrying data channels and component carriers for carrying control channels, where the mapping relationships are currently configurable for the UE; a first selection unit 1007, configured to select a mapping relationship from the multiple mapping relationships; and a first sending unit 1008, configured to send first mapping relationship indication information to the UE, where the first mapping relationship indication information is used to indicate a mapping relationship selected by the NodeB from the multiple mapping relationships between the component carriers for carrying data channels and the component carriers for carrying control channels, where the mapping relationships are currently capable of being used by the UE. In this case, the temporary candidate control channel resource determination unit 1002 is configured to determine the temporary candidate control channel resources corresponding to each type of control channel currently configurable for the UE, according to the mapping relationship between the component carrier for carrying a data channel and the component carrier for carrying a control channel, where the mapping relationship is currently configured for the UE and is selected by the first selection unit 1006.

Figure 10C:
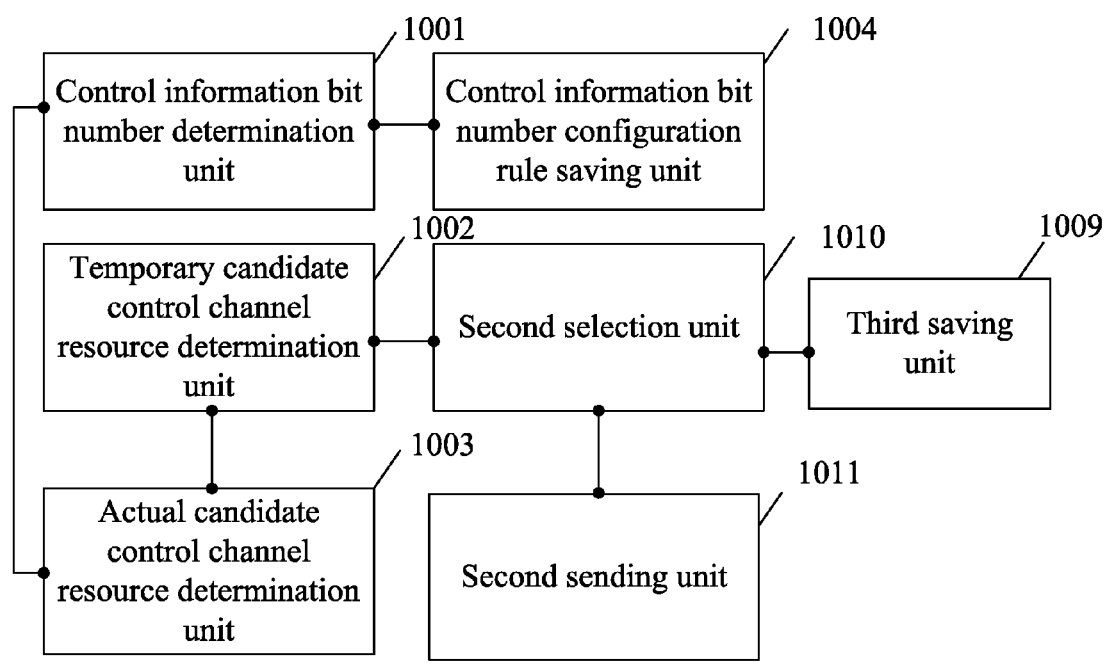
FIG. 10C is yet another structural diagram of a NodeB according to Embodiment 6 of the present invention.

Alternatively, as shown in FIG. 10C, the NodeB further includes: a third saving unit 1009, configured to save a mapping rule, where the mapping rule includes at least one of the following rules: when a component carrier for carrying a data channel can carry a control channel, the component carrier for carrying a data channel and a mapped component carrier thereof for carrying a control channel are the same component carrier; when a downlink component carrier paired with an uplink component carrier for carrying a data channel can carry a control channel, the uplink component carrier for carrying a data channel and a mapped component carrier thereof for carrying a control channel are component carriers of a same component carrier pair; component carriers of different component carrier bandwidth levels for carrying data channels cannot be mapped to a same component carrier for carrying a control channel; component carriers of different transmission modes for carrying data channels cannot be mapped to a same component carrier for carrying a control channel; and component carriers of different frequency bands for carrying data channels cannot be mapped to a same component carrier for carrying a control channel; a second selection unit 1010, configured to select a mapping relationship from the multiple mapping relationships between the component carriers for carrying data channels and the component carriers for carrying control channels configurable for the UE under the mapping rule; and a second sending unit 1011, configured to send second mapping relationship indication information to the UE, where the second mapping relationship indication information is configured to indicate a mapping relationship between a component carrier for carrying a data channel and a component carrier for carrying a control channel, where the mapping relationship is currently configurable for the UE under the mapping rule predefined by a standard. In this case, the temporary candidate control channel resource determination unit 1002 is configured to determine the temporary candidate control channel resources corresponding to each type of control channel currently configurable for the UE, according to the mapping relationship between the component carrier for carrying a data channel and the component carrier for carrying a control channel, where the mapping relationship is currently configured for the UE and is selected by the second selection unit.

According to Embodiment 6 of the present invention, in a NodeB device, the temporary candidate control channel resources corresponding to the control channel currently configurable for the UE are determined according to the mapping relationship between the component carrier for carrying a data channel and the component carrier for carrying a control channel, so the temporary candidate control channel resources of the control channel corresponding to different component carriers for carrying data channels may be different. For the control channels that are currently configurable for the UE and are of the same CCE aggregation level, when the numbers of the downlink control information bits of one or more other types of control channels are the same as the number of the downlink control information bits of the selected type of control channel, the actual candidate control channel resources corresponding to the selected type of control channel are determined to be all of the CCEs of the union of the temporary candidate control channel resources corresponding to all or a part of the control channels with the same number of the downlink control information bits, or to be a part of the CCEs of the union of the temporary candidate control channel resources corresponding to all or a part of the control channels with the same number of the downlink control information bits. In addition, the temporary candidate control channel resources of the control channels corresponding to different component carriers for carrying data channels may be different, so after combining, the candidate control channel resources corresponding to the control channel are enlarged. Therefore in a carrier aggregation system, the blocking probability of control channel scheduling in the actual candidate control channel resources corresponding to the control channel is decreased.

Those of ordinary skill in the art should understand that all or a part of the steps of the method according to the embodiments may be implemented by a program instructing relevant hardware. The program may be stored in a computer readable storage medium, such as a read-only memory, a magnetic disk, and an optical disk.

The method and the device for determining a search space and candidate control channel resources according to the embodiments of the present invention are introduced in detail above. The principle and implementation of the present invention are described herein through specific examples. The description about the embodiments of the present invention is merely used to facilitate understanding of the methods and core ideas of the present invention. Persons of ordinary skill in the art can make variations and modifications to the present invention in terms of the specific implementations and application scopes according to the ideas of the present invention. Therefore, the specification shall not be construed as a limit to the present invention.

What is claimed is:

1. A method for determining a search space, the method comprising:
    determining a number of downlink control information bits of each type of control channel currently required to be monitored by a user equipment (UE);
    determining a temporary search space corresponding to each component carrier for carrying a data channel according to a mapping relationship between a component carrier for carrying a data channel and a component carrier for carrying a control channel, wherein the mapping relationship is currently used by the UE;
    determining a temporary search space corresponding to each type of control channel currently required to be monitored by the UE, according to a control channel corresponding to a component carrier of the UE for carrying a data channel and the temporary search space corresponding to each component carrier for carrying a data channel; and
    determining that an actual search space corresponding to a selected type of control channel with a first number of the downlink control information bits is all control channel elements (CCEs) of a union of temporary search spaces corresponding to all or a part of control channels with the first number of the downlink control information bits, or a part of the CCEs of the union of the temporary search spaces corresponding to all or a part of the control channels with the first number of the downlink control information bits, for control channels that are currently required to be monitored by the UE and are of a same CCE aggregation level, when there are one or more other types of control channels with the first number of the downlink control information bits;
    wherein the control channels that are currently required to be monitored by the UE and are of the same CCE aggregation level comprise the selected type of control channel and the one or more other types of control channels with the first number of the downlink control information bits, and the all or a part of control channels with the first number of the downlink control information bits are all or a part of control channels in a union of the one or more other types of control channels with the first number of the downlink control information bits and the selected type of control channel with the first number of the downlink control information bits.

2. The method according to claim 1, wherein, for the control channels that are currently required to be monitored by the UE and are of the same CCE aggregation level, when a number of downlink control information bits of other types of control channels are all different from the number of the downlink control information bits of the selected type of control channel, the actual search space corresponding to the selected type of control channel is determined to be a temporary search space corresponding to the selected type of control channel.

3. The method according to claim 1, wherein determining the number of the downlink control information bits of each type of control channel currently required to be monitored by the UE comprises:
    determining the number of the downlink control information bits of each type of control channel currently required to be monitored by the UE according to a configuration rule of the number of the downlink control information bits and a format of downlink control information (DCI) carried by each type of control channel currently required to be monitored by the UE, wherein the configuration rule of the number of the downlink control information bits is a rule specifying that numbers of downlink control information bits of multiple DCI formats are same.

4. The method according to claim 1, wherein, before determining a temporary search space corresponding to each type of control channel currently required to be monitored by the UE, the method further comprises:
    receiving, by the UE, first mapping relationship indication information sent by a NodeB, wherein the first mapping relationship indication information is used to indicate the mapping relationship selected by the NodeB from multiple mapping relationships between component carriers for carrying data channels and component carriers for carrying control channels, wherein the multiple mapping relationships are currently configurable for the UE; and
    according to the first mapping relationship indication information, determining, by the UE, the mapping relationship.

5. The method according to claim 1, wherein, before the temporary search space corresponding to each type of control channel currently required to be monitored by the UE is determined, the method further comprises:
    receiving, by the UE, second mapping relationship indication information sent by a NodeB, wherein the second mapping relationship indication information is used to indicate the mapping relationship, wherein the mapping relationship is currently used by the UE under a mapping rule;
    wherein the mapping rule comprises at least one of the following rules:
    when a first component carrier for carrying a data channel can carry a control channel, the first component carrier for carrying a data channel and a mapped component carrier thereof for carrying a control channel are same;
    when a downlink component carrier paired with an uplink component carrier for carrying a data channel can carry a control channel, the uplink component carrier for carrying a data channel and a mapped component carrier thereof for carrying a control channel are component carriers of a same component carrier pair;

component carriers of different component carrier bandwidth levels for carrying data channels cannot be mapped to a same component carrier for carrying a control channel;

component carriers of different transmission modes for carrying data channels cannot be mapped to a same component carrier for carrying a control channel; and component carriers of different frequency bands for carrying data channels cannot be mapped to a same component carrier for carrying a control channel.

6. The method according to claim 1, wherein, before determining the temporary search space corresponding to each type of control channel currently required to be monitored by the UE, the method further comprises:

determining a type of control channel corresponding to each component carrier for carrying a data channel.

7. The method according to claim 1, wherein, determining that an actual search space corresponding to a selected type of control channel with a first number of the downlink control information bits is all control channel elements (CCEs) of a union of temporary search spaces corresponding to a part of control channels with the first number of the downlink control information bits, comprises:

determining that an actual search space corresponding to a selected type of control channel with the first number of the downlink control information bits is all CCEs of the union of temporary search spaces corresponding to a part of control channels with the first number of the downlink control information bits, wherein the union of temporary search spaces corresponding to a part of control channels is carried on a part of component carriers for carrying a control channel.

8. A method for determining candidate control channel resources, the method comprising:

determining a number of downlink control information bits of each type of control channel currently configurable for a user equipment (UE);

determining temporary candidate control channel resources corresponding to each component carrier for carrying a data channel according to a mapping relationship between a component carrier for carrying a data channel and a component carrier for carrying a control channel, wherein the mapping relationship is currently configured for the UE; and determining temporary candidate control channel resources corresponding to each type of control channel currently required to be monitored by the UE, according to a control channel corresponding to the component carrier for carrying a data channel and the temporary candidate control channel resources corresponding to each component carrier for carrying a data channel; and determining that actual candidate control channel resources corresponding to a selected type of control channel with a first number of the downlink control information bits are all control channel elements (CCEs) of a union of temporary candidate control channel resources corresponding to all or a part of control channels with the first number of the downlink control information bits, or a part of the CCEs of the union of the temporary candidate control channel resources corresponding to all or a part of the control channels with the first number of the downlink control information bits, for control channels that are currently configurable for the UE and are of a same CCE aggregation level, when there are one or more other types of control channels with the first number of the downlink control information bits, wherein the control channels that are currently configurable for the UE and are of the same CCE aggregation level comprise the selected type of control channel and the one or more other types of control channels with the first number of the downlink control information bits, and the all or a part of control channels with the first number of the downlink control information bits are all or a part of control channels in a union of the one or more other types of control channels with the first number of the downlink control information bits and the selected type of control channel.

9. The method according to claim 8, comprising determining that the actual candidate control channel resources corresponding to the selected type of control channel are temporary candidate control channel resources corresponding to the selected type of control channel, for the control channels that are currently configurable for the UE and are of the same CCE aggregation level, when numbers of downlink control information bits of other types of control channels are all different from the number of the downlink control information bits of the selected type of control channel.

10. The method according to claim 8, wherein determining the number of downlink control information bits of each type of control channel currently configurable for the UE comprises:

determining the number of the downlink control information bits of each type of control channel currently configurable for the UE, according to a configuration rule of the number of the downlink control information bits and a format of downlink control information (DCI) carried by each type of control channel currently configurable for the UE, wherein the configuration rule of the number of the downlink control information bits is a rule specifying that numbers of the downlink control information bits of multiple DCI formats are same.

11. The method according to claim 8, wherein before determining the temporary candidate control channel resources corresponding to each type of control channel currently configurable for the UE, the method further comprises:

selecting, by a NodeB, a first mapping relationship from multiple mapping relationships between component carriers for carrying data channels and component carriers for carrying control channels, wherein the multiple mapping relationships are currently configurable for the UE, and sending the first mapping relationship indication information to the UE, wherein the first mapping relationship indication information is used to indicate the first mapping relationship.

12. The method according to claim 8, wherein before the temporary candidate control channel resources corresponding to each type of control channel currently configurable for the UE are determined, the method further comprises:

selecting, by a NodeB, a second mapping relationship between a component carrier for carrying a data channel and a component carrier for carrying a control channel according to a mapping rule, and sending the second mapping relationship indication information to the UE, wherein the second mapping relationship indication information is used to indicate the second mapping relationship, wherein the mapping rule comprises at least one of the following rules:

when a first component carrier for carrying a data channel can carry a control channel, the first component carrier for carrying a data channel and a mapped component carrier thereof for carrying a control channel are a single component carrier;

when a downlink component carrier paired with an uplink component carrier for carrying a data channel can carry a control channel, the uplink component carrier for carrying a data channel and a mapped component carrier thereof for carrying a control channel are component carriers of a same component carrier pair;

component carriers of different component carrier bandwidth levels for carrying data channels cannot be mapped to a same component carrier for carrying a control channel;

component carriers of different transmission modes for carrying data channels cannot be mapped to a same component carrier for carrying a control channel; and component carriers of different frequency bands for carrying data channels cannot be mapped to a same component carrier for carrying a control channel.

13. A user equipment, UE, comprising:
a control information bit number determination unit, configured to determine a number of downlink control information bits of each type of control channel currently required to be monitored by the UE;
a temporary search space determination unit, configured to determine a temporary search space corresponding to each component carrier for carrying a data channel according to a mapping relationship between a component carrier for carrying a data channel and a component carrier for carrying a control channel, wherein the mapping relationship is currently used by the UE, and determine a temporary search space corresponding to each type of control channel currently required to be monitored by the UE, according to a control channel corresponding to a component carrier of the UE for carrying a data channel and the temporary search space corresponding to each component carrier for carrying a data channel; and
an actual search space determination unit, configured to determine that an actual search space corresponding to a selected type of control channel with a first number of the downlink control information bits is all CCEs of a union of temporary search spaces corresponding to all or a part of control channels with the first number of the downlink control information bits, or a part of the CCEs of the union of the temporary search spaces corresponding to all or a part of the control channels with the first number of the downlink control information bits, for control channels that are currently required to be monitored by the UE and of a same CCE aggregation level, when there are one or more other types of control channels with the first number of the downlink control information bits, wherein the control channels that are currently required to be monitored by the UE and are of the same CCE aggregation level comprise the selected type of control channel and the one or more other types of control channels with the first number of the downlink control information bits, and the all or a part of control channels with the first number of the downlink control information bits are all or a part of control channels in a union of the one or more other types of control channels with the first number of the downlink control information bits and the selected type of control channel with the first number of the downlink control information bits.

14. The user equipment according to claim 13, wherein the actual search space determination unit is further configured to determine that the actual search space corresponding to the selected type of control channel is a temporary search space corresponding to the selected type of control channel, for the control channels of the same CCE aggregation level, when numbers of downlink control information bits of other types of control channels are all different from the number of the downlink control information bits of the selected type of control channel.

15. The user equipment according to claim 13, wherein the user equipment further comprises:
a first receiving unit, configured to receive first mapping relationship indication information sent by a NodeB, wherein the first mapping relationship indication information is used to indicate the mapping relationship selected by the NodeB from multiple mapping relationships between component carriers for carrying data channels and component carriers for carrying control channels, wherein the multiple mapping relationships are currently capable of being used by the UE; and
a first mapping relationship determination unit, configured to determine, according to the first mapping relationship indication information, the mapping relationship;
wherein the temporary search space determination unit is configured to determine the temporary search space corresponding to each component carrier for carrying a data channel according to the mapping relationship indicated by the first mapping relationship indication information, and determine the temporary search space corresponding to each type of control channel currently required to be monitored by the UE, according to a control channel corresponding to a component carrier of the UE for carrying a data channel and the temporary search space corresponding to each component carrier for carrying a data channel.

16. The user equipment according to claim 13, wherein the user equipment further comprises:
a second receiving unit, configured to receive second mapping relationship indication information sent by a NodeB, wherein the second mapping relationship indication information is used to indicate the mapping relationship, wherein the mapping relationship is currently used by the UE under a mapping rule;
wherein the mapping rule comprises at least one of the following rules:
when a first component carrier for carrying a data channel can carry a control channel, the first component carrier for carrying a data channel and a mapped component carrier thereof for carrying a control channel are a single component carrier; when a downlink component carrier paired with an uplink component carrier for carrying a data channel can carry a control channel, the uplink component carrier for carrying a data channel and a mapped component carrier thereof for carrying a control channel are component carriers of a same component carrier pair; component carriers of different component carrier bandwidth levels for carrying data channels cannot be mapped to a same component carrier for carrying a control channel; component carriers of different transmission modes for carrying data channels cannot be mapped to a same component carrier for carrying a control channel; and component carriers of different frequency bands for carrying data channels cannot be mapped to a same component carrier for carrying a control channel; and
the temporary search space determination unit, configured to determine the temporary search space corresponding to each type of control channel currently required to be monitored by the UE, according to the mapping relationship indicated by the second mapping relationship indication information.

17. The user equipment according to claim 13, wherein,
the actual search space determination unit is configured to determine that an actual search space corresponding to a selected type of control channel with the first number of the downlink control information bits is all CCEs of the union of temporary search spaces corresponding to a part of control channels with the first number of the downlink control information bits, wherein the union of temporary search spaces corresponding to a part of control channels is carried on a part of component carriers for carrying a control channel.

18. A NodeB, comprising:
a control information bit number determination unit, configured to determine a number of downlink control information bits of each type of control channel currently configurable for a user equipment (UE);
a temporary candidate control channel resource determination unit, configured to determining temporary candidate control channel resources corresponding to each component carrier for carrying a data channel according to a mapping relationship between a component carrier for carrying a data channel and a component carrier for carrying a control channel, wherein the mapping relationship is currently configured for the UE, and determining temporary candidate control channel resources corresponding to each type of control channel currently required to be monitored by the UE, according to a control channel corresponding to the component carrier for carrying a data channel and the temporary candidate control channel resources corresponding to each component carrier for carrying a data channel; and
an actual candidate control channel resource determination unit, configured to determine that actual candidate control channel resources corresponding to a selected type of control channel with a first number of the downlink control information bits are all CCEs of a union of temporary candidate control channel resources corresponding to all or a part of control channels with the first number of the downlink control information bits, or a part of the CCEs of the union of the temporary candidate control channel resources corresponding to all or a part of the control channels with the first number of the downlink control information bits, for control channels that are currently configurable for the UE and are of a same CCE aggregation level, when there are one or more other types of control channels with the first number of the downlink control information bits, wherein the control channels that are currently configurable for the UE and are of the same CCE aggregation level comprise the selected type of control channel and the one or more other types of control channels with the first number of the downlink control information bits, and the all or a part of control channels with the first number of the downlink control information bits are all or a part of control channels in a union of the one or more other types of control channels with the first number of the downlink control information bits and the selected type of control channel.

19. The NodeB according to claim 18, wherein
the actual candidate control channel resource determination unit is further configured to determine that the actual candidate control channel resources corresponding to the selected type of control channel are temporary candidate control channel resources corresponding to the selected type of control channel, when for the control channels of a same CCE aggregation level, numbers of downlink control information bits of other types of control channels are all different from the number of the downlink control information bits of the selected type of control channel.

20. The NodeB according to claim 18, wherein the NodeB further comprises:
a first selection unit, configured to select a first mapping relationship from multiple mapping relationships between component carriers for carrying data channels and component carriers for carrying control channels, wherein the multiple mapping relationships are currently configurable for the user equipment;
a first sending unit, configured to send first mapping relationship indication information to the UE, wherein the first mapping relationship indication information is used to indicate the first mapping relationship
wherein the temporary candidate control channel resource determination unit is configured to determine temporary candidate control channel resources corresponding to each type of control channel currently configurable for the UE, according to the mapping relationship between the component carrier for carrying a data channel and the component carrier for carrying a control channel, wherein the mapping relationship is currently configured for the user equipment and is selected by the first selection unit.

21. The NodeB according to claim 20, wherein the NodeB further comprises:
a third saving unit, configured to save a mapping rule, wherein the mapping rule comprises at least one of the following rules:
when a first component carrier for carrying a data channel can carry a control channel, the first component carrier for carrying a data channel and a mapped component carrier thereof for carrying a control channel are same; when a downlink component carrier paired with an uplink component carrier for carrying a data channel can carry a control channel, the uplink component carrier for carrying a data channel and a mapped component carrier thereof for carrying a control channel are component carriers of a same component carrier pair; component carriers of different component carrier bandwidth levels for carrying data channels cannot be mapped to a same component carrier for carrying a control channel; component carriers of different transmission modes for carrying data channels cannot be mapped to a same component carrier for carrying a control channel; and component carriers of different frequency bands for carrying data channels cannot be mapped to a same component carrier for carrying a control channel;
a second selection unit, configured to select a second mapping relationship from the multiple mapping relationships between the component carriers for carrying data channels and the component carriers for carrying control channels, wherein the mapping relationships are configurable for the user equipment under the mapping rule saved by the third saving unit, and
a second sending unit, configured to send second mapping relationship indication information to the UE, wherein the second mapping relationship indication information is used to indicate the second mapping relationship;
wherein the temporary candidate control channel resource determination unit is configured to determine temporary candidate control channel resources corresponding to each type of control channel currently configurable for the UE, according to the mapping relationship between the component carrier for carrying a data channel and the component carrier for carrying a control channel, wherein the mapping relationship is currently configured for the user equipment and is selected by the second selection unit.

* * * * *